(12) United States Patent
Trujillo et al.

(10) Patent No.: US 12,475,473 B1
(45) Date of Patent: Nov. 18, 2025

(54) SYSTEM AND METHOD FOR SOFTWARE INTEGRATION INTO ENTERPRISE STANDARD CONTROL SYSTEMS USING STANDARDIZED APIS

(71) Applicant: IONITE ENTERPRISE SOFTWARE INC., Phoenix, AZ (US)

(72) Inventors: Andrew Trujillo, Phoenix, AZ (US); Andrew Sutton Trujillo, Phoenix, AZ (US); John Trujillo, Phoenix, AZ (US); Steve Wideman, Phoenix, AZ (US)

( * ) Notice: Subject to any disclaimer, the term of this patent is extended or adjusted under 35 U.S.C. 154(b) by 0 days.

(21) Appl. No.: 19/226,046

(22) Filed: Jun. 2, 2025

Related U.S. Application Data

(60) Provisional application No. 63/763,048, filed on Feb. 25, 2025.

(51) Int. Cl.
*G06Q 30/018* (2023.01)
(52) U.S. Cl.
CPC .................... *G06Q 30/0185* (2013.01)
(58) Field of Classification Search
CPC .................................................. G06Q 30/0185
See application file for complete search history.

(56) References Cited

U.S. PATENT DOCUMENTS

| | | | |
|---|---|---|---|
| 7,552,481 | B2 | 6/2009 | Moona et al. |
| 8,443,429 | B1 | 5/2013 | Johnson, Sr. et al. |
| 8,839,395 | B2 | 9/2014 | Poliashenko et al. |
| 8,990,911 | B2 | 3/2015 | Olden et al. |
| 9,473,485 | B2 | 10/2016 | Kendall |

(Continued)

FOREIGN PATENT DOCUMENTS

| | | |
|---|---|---|
| CN | 115619130 A | 1/2023 |
| IN | 202241059874 A | 11/2022 |
| TW | M636570 U | 1/2023 |
| WO | WO2024163408 A1 | 8/2024 |

OTHER PUBLICATIONS

JumpCloud; https://jumpcloud.com/; 2024 [accessed Jul. 9, 2025].

(Continued)

*Primary Examiner* — Oleg Korsak
(74) *Attorney, Agent, or Firm* — HULSEY P.C.

(57) ABSTRACT

System and method for integrating software applications into enterprise standard control systems are disclosed. The method includes identifying enterprise standards associated with an ESP and identifying software applications provided by an EAP for integration with the enterprise standards. Communication is facilitated between the ESP and the EAP via an ESP-API and an EAP-API respectively. The method further involves verifying whether the EAP satisfies enterprise standards by executing a compliance test and determining compatibility between the ESP and EAP based on shared protocols. Upon successful compliance verification, the method automates the integration of the software application into the enterprise standard control system and generates an integration record cataloging the integrated software application, the applied enterprise standards, and associated enterprise standard extensions (EXTs). The method further includes authenticating enterprise ownership of the software application using an OAuth token, enterprise purchase record, or enterprise user approval workflow.

20 Claims, 13 Drawing Sheets

(56) References Cited

U.S. PATENT DOCUMENTS

| | | | |
|---|---|---|---|
| 12,034,854 B2 | 7/2024 | Ayyadevara et al. | |
| 12,095,881 B1 | 9/2024 | Turner et al. | |
| 12,143,817 B2 | 11/2024 | Avetisov et al. | |
| 2006/0294578 A1* | 12/2006 | Burke | G06F 21/604 726/2 |
| 2014/0047028 A1* | 2/2014 | Buth | G06F 9/546 709/204 |
| 2015/0268881 A1* | 9/2015 | Nielsen | G06F 3/065 711/114 |
| 2017/0208099 A1* | 7/2017 | Schmidt | H04L 9/3247 |
| 2018/0205701 A1* | 7/2018 | Kakhandiki | G06F 21/57 |
| 2019/0050780 A1* | 2/2019 | Koch | G06Q 10/06393 |
| 2020/0137097 A1* | 4/2020 | Zimmermann | H04L 63/1425 |
| 2023/0113325 A1 | 4/2023 | Nagaraja et al. | |
| 2023/0342179 A1 | 10/2023 | Suttle et al. | |
| 2024/0129289 A1 | 4/2024 | Casey et al. | |
| 2024/0266010 A1 | 8/2024 | Adhikari et al. | |
| 2024/0281341 A1 | 8/2024 | Brajkovic et al. | |

OTHER PUBLICATIONS

Okta; https://www.okta.com/products/single-sign-on-workforce-identity/; 2024 [accessed Jul. 9, 2025].
Citrix; https://www.citrix.com/; 2024 [accessed Jul. 9, 2025].
OneLogin; https://www.onelogin.com/product/sso; 2024 [accessed Jul. 9, 2025].
Keeper Security; https://www.keepersecurity.com/; 2024 [accessed Jul. 9, 2025].
Ping Identity; https://www.pingidentity.com/en.html; 2024 [accessed Jul. 9, 2025].
Microsoft Azure Active Directory; https://www.microsoft.com/en-us/security/business/identity-access/microsoft-entra-id; 2024 [accessed Jul. 9, 2025].
LastPass; https://www.lastpass.com/products/sso; 2024 [accessed Jul. 9, 2025].
IBM Security Verify Access; https://www.ibm.com/verify; 2024 [accessed Jul. 9, 2025].
Micro Focus NetIQ Secure Login; https://www.opentext.com/products/advanced-authentication; 2024 [accessed Jul. 9, 2025].
Avatier; https://www.avatier.com/; 2024 [accessed Jul. 9, 2025].
Zapier; https://zapier.com/; 2024 [accessed Jul. 9, 2025].
IBM App Connect; https://www.ibm.com/products/app-connect; 2024 [accessed Jul. 9, 2025].
Workato; https://www.workato.com/; 2024 [accessed Jul. 9, 2025].
Microsoft Power Automate; https://www.microsoft.com/en-us/power-platform/products/power-automate; 2024 [accessed Jul. 9, 2025].
Apache Camel; https://camel.apache.org/; 2024 [accessed Jul. 9, 2025].
Make; https://www.make.com; 2024 [accessed Jul. 9, 2025].

* cited by examiner

SYSTEM AND METHOD FOR SOFTWARE INTEGRATION INTO ENTERPRISE STANDARD CONTROL SYSTEMS USING STANDARDIZED APIS

CROSS REFERENCE TO RELATED APPLICATIONS

This application is a non-provisional application claims the benefit of U.S. Provisional Patent Application 63/763, 048, titled "SYSTEM AND METHOD FOR SOFTWARE INTEGRATION INTO ENTERPRISE STANDARD CONTROL SYSTEMS USING STANDARDIZED APIs", filed on Feb. 25, 2025; the entirety of which is incorporated herein by reference.

BACKGROUND OF THE INVENTION

Field of the Invention

The present invention relates to the field of enterprise software integration and cybersecurity, and particularly relates to a system and method for integrating software applications into enterprise standard control systems using standardized APIs.

Description of the Prior Art

In modern enterprises, software applications play a critical role in streamlining business operations, enhancing productivity, and ensuring security compliance. Organizations utilize a wide range of third-party software applications, often sourced from different enterprise application providers (EAPs), to meet their operational needs. These applications, ranging from productivity tools to security solutions, are integrated into an enterprise's ecosystem, which is governed by specific enterprise standards. These standards, typically defined and enforced by enterprise standard providers (ESPs), ensure uniformity, interoperability, and security compliance across the enterprise's software landscape.

To achieve this standardization, enterprise control systems, such as Single Sign-On (SSO), Identity and Access Management (IAM), Privileged Access Management (PAM), Governance, Risk, and Compliance (GRC), and Configuration Management Databases (CMDB), must be seamlessly integrated with all enterprise applications. This integration ensures centralized control, simplified user access, and consistent adherence to security protocols. However, achieving such integration remains a complex and resource-intensive task due to the diverse protocols, architectures, and compliance requirements associated with different software applications and enterprise standards.

Currently, enterprises face significant challenges in integrating newly procured software applications into their existing enterprise control systems. Each integration typically requires manual effort from IT administrators and developers, who must identify the enterprise standards supported by the enterprise application, verify compatibility with the organization's existing ESPs, and configure the software to align with enterprise requirements. This manual integration process is not only time-consuming and costly but also prone to errors, leading to potential security vulnerabilities and operational inefficiencies. Furthermore, as enterprise standards evolve and software applications undergo updates, maintaining compliance and ensuring seamless integration becomes an ongoing challenge.

Several attempts have been made to address the complexity of enterprise software integration. For example, US20240266010A1 discloses a clinical trial management platform that centralizes access to multiple clinical trial software services through a single authentication process, but it focuses solely on user task management rather than enterprise-standard integration. Similarly, U.S. Pat. No. 7,552,481 B2 discloses a system for single sign-on (SSO) access to multiple applications through a single authentication process, but it lacks provisions for ensuring enterprise-standard compliance across diverse software environments. U.S. Pat. No. 9,473,485B2 describes a system where a user can access federated apps without re-authentication, but it does not address the complexities of integrating enterprise standards. Moreover, US20240281341A1 discloses an automatic service discovery system for SaaS applications using SSO, but it falls short of providing standardized integration protocols for enterprise control systems. WO2024163408A1 introduces SSO connectors for detecting login events but does not address the broader challenge of automating integration with multiple enterprise standards.

Despite these advancements, enterprises continue to face integration challenges due to the lack of a standardized, automated, and comprehensive system for aligning software applications with enterprise control systems. Current solutions are limited to specific use cases, such as user authentication, task management, or service discovery, without addressing the end-to-end integration lifecycle. Furthermore, they often require vendor-specific configurations, leading to interoperability issues, vendor lock-in, and increased operational overhead.

Thus, there is a requirement of a system and method for integrating software applications into enterprise standard control systems using standardized APIs to overcome the above-mentioned drawbacks.

The information disclosed in this background of the disclosure section is only for enhancement of understanding of the general background of the disclosure and should not be taken as an acknowledgment or any form of suggestion that this information forms existing information already known to a person skilled in the art.

SUMMARY OF THE INVENTION

An object of the present disclosure is to provide a system and method (together termed as "mechanism") for integrating software applications into enterprise standard control systems using standardized APIs. The disclosed mechanism enables seamless interoperability between third-party software applications and enterprise control systems while ensuring continuous compliance with enterprise standards.

The disclosed mechanism operates by identifying the enterprise standards associated with an enterprise control system and determining the compatibility of a software application provided by an enterprise application provider (EAP) with the identified standards. This compatibility assessment involves verifying whether the application supports the protocols, security configurations, and data exchange requirements mandated by the enterprise standards. Upon successful compatibility verification, the disclosed mechanism automates the configuration of the software application to align with the enterprise standards. This includes establishing secure communication channels, exchanging authentication tokens, mapping user attributes, and configuring login/logout URLs. The automation ensures that the application integrates seamlessly into the enterprise environment without requiring extensive manual intervention.

Further, the disclosed mechanism supports enterprise standard extensions (EXTs), such as multi-factor authentication (MFA), attribute synchronization, and privileged session monitoring. The extensions are activated when both the enterprise control system and the software application support the specific features, thereby enhancing integration capabilities. The disclosed mechanism also ensures continuous compliance by periodically revalidating the integrated application against evolving enterprise standards. The periodic revalidation includes maintaining detailed integration records, including metadata, protocol types, exchanged security tokens, and user attribute mappings. This catalog serves as a centralized repository for monitoring, auditing, and troubleshooting integration-related activities. To prevent unauthorized integrations, the disclosed mechanism incorporates proof-of-ownership verification. The verification includes authenticating enterprise ownership of the software application. The authentication includes OAuth token-based authentication, enterprise purchase records, or an approval workflow initiated by authorized enterprise users. Such authentications ensure that only legitimate enterprise entities can integrate software applications into their control systems.

The disclosed mechanism further enhances enterprise management by providing risk assessment insights, identifying potential vulnerabilities, recommending mitigation strategies, and enabling enterprises to make informed decisions regarding software procurement and integration. By automating the entire integration lifecycle, i.e. from compatibility assessment and configuration to deployment, monitoring, and compliance, the disclosed mechanism significantly reduces the time, cost, and effort associated with enterprise software integration. Further, the disclosed mechanism eliminates manual configuration, minimizes human errors, and ensures that every integrated application adheres to enterprise security, governance, and operational standards. Furthermore, the disclosed mechanism provides enterprises with a comprehensive, scalable, and secure solution for integrating third-party software applications into their existing control systems. Moreover, the disclosed mechanism empowers organizations to embrace new technologies while maintaining stringent adherence to enterprise standards, ultimately enhancing operational efficiency, security, and compliance across the enterprise ecosystem.

An embodiment of the present disclosure discloses the system for integrating software applications into enterprise standard control systems using standardized APIs. The system facilitates seamless integration of enterprise application provider (EAP) software with enterprise standard provider (ESP) control systems while ensuring continuous compliance with enterprise standards. In an embodiment, the system includes an enterprise standard recognition module to identify enterprise standards associated with an enterprise standard provider (ESP). Further, the enterprise standard recognition module ensures that the system recognizes the specific enterprise protocols and compliance requirements that govern the integration of software applications within an enterprise ecosystem.

In an embodiment, the system includes an application integration module to identify software applications provided by an enterprise application provider (EAP) for integration with the identified enterprise standards. Further, the enterprise standard recognition module facilitates the detection and onboarding of third-party software applications requiring integration into an enterprise's existing control systems.

In an embodiment, the system includes an interface module to facilitate seamless communication between the ESP and the EAP. The interface module includes an ESP-API interface for facilitating communication with the enterprise standard provider and an EAP-API interface for facilitating communication with the enterprise application provider. Such interfaces enable secure and efficient data exchange between the enterprise control systems and the software application being integrated.

In an embodiment, to ensure compliance with enterprise standards, the system includes a compliance validation module to verify whether the EAP satisfies one or more enterprise standards by executing a compliance test. The compliance validation module determines the compatibility between the ESP and EAP based on shared protocols and ensures that the software application adheres to the necessary enterprise standards before integration. In some embodiments, the compliance validation module further comprises an automated test suite to periodically revalidate the compliance of the integrated software application. If the integrated application fails a periodic revalidation test, the system may suspend or terminate the integration to maintain enterprise security and operational integrity.

In an embodiment, the system includes an integration management module to automate the integration of the software application into the enterprise standard control system upon successful compliance validation. The integration management module generates an integration record cataloging the integrated software application, the enterprise standard applied, and any associated enterprise standard extensions (EXTs). In some embodiments, the integration management module automatically configures an enterprise standard extension only when both the ESP and EAP support the extension. The integration management module may further include a rollback mechanism configured to reverse the integration in response to a failure event or compliance breach.

In an embodiment, the system includes a proof-of-ownership module to authenticate enterprise ownership of the software application before integration. The proof-of-ownership module ensures that only authorized enterprise entities can integrate software applications by verifying ownership using an OAuth token, an enterprise purchase record, and/or an enterprise user approval workflow. In some embodiments, the proof-of-ownership module includes an approval workflow engine to identify enterprise users authorized to approve integration, notify the authorized user, and collect and validate an OAuth token for the requested integration. Additionally, the proof-of-ownership module automatically validates ownership when the software application is procured through the system.

In an embodiment, to facilitate ongoing monitoring and management, the system includes a catalog module to maintain a repository of integrated enterprise applications. The repository includes details such as the enterprise standard compliance status for each application, associated extensions implemented, and a risk assessment based on the application's security profile. In some embodiments, the catalog module generates risk mitigation recommendations based on periodic compliance assessments, enabling enterprises to proactively address potential vulnerabilities and maintain continuous adherence to enterprise standards.

In an embodiment, the system supports multi-protocol communication by ensuring that the ESP-API interface and EAP-API interface support RESTful APIs, GraphQL APIs, and SOAP APIs for data exchange. The ESP-API interface encrypts communication with the ESP using TLS encryption, while the EAP-API interface supports multi-protocol communication, including SAML, OIDC, and OAuth. Further, the system is implemented in a cloud-based environment and supports integration across multi-tenant architectures, enabling scalable deployment across enterprise infrastructures.

An embodiment of the present disclosure discloses the method for integrating software applications into enterprise standard control systems. The method includes the steps of identifying enterprise standards associated with an enterprise standard provider (ESP). Such identification ensures that the enterprise control system recognizes the specific protocols and compliance requirements that govern software integration within an enterprise ecosystem. Further, the method includes the steps of identifying software applications provided by an enterprise application provider (EAP) for integration with the identified enterprise standards. Such identification facilitates the detection and onboarding of third-party software applications requiring integration into the enterprise's existing control systems.

In an embodiment, to enable seamless communication between the ESP and EAP, the method includes facilitating communication via an ESP-API for communication with the ESP and an EAP-API for communication with the EAP. The interfaces support standardized, secure data exchange between the enterprise control system and the software application being integrated. Further, the method includes verifying whether the EAP satisfies the enterprise standards by executing a compliance test and determining compatibility between the ESP and EAP based on shared protocols. The verification ensures that the software application meets the enterprise's compliance requirements before integration. Upon successful compliance verification, the method includes automating the integration of the software application into the enterprise standard control system and generating an integration record, cataloging the integrated software application, the enterprise standard applied, and any associated enterprise standard extensions (EXTs). In some embodiments, the integration record includes metadata, such as protocol type, security tokens exchanged, user attribute mappings, and login/logout URLs.

In an embodiment, to ensure continued compliance, the method includes periodically revalidating the compliance of the integrated software application using an automated test suite. If the software application fails the periodic revalidation test, the method includes suspending or terminating the integration, thereby maintaining enterprise security and operational integrity. In an embodiment, the method includes identifying and supporting enterprise standard extensions (EXTs) for enhanced functionalities, including but not limited to attribute synchronization, privileged session monitoring, and multi-factor authentication. The method further includes automatically configuring an enterprise standard extension only when both the ESP and EAP support the extension.

In an embodiment, the method further includes the steps of facilitating communication between the ESP and EAP via APIs to support RESTful APIs, GraphQL APIs, and SOAP APIs for data exchange. To ensure secure communication, the method includes encrypting communication between the ESP and the enterprise control system using TLS encryption and supporting multi-protocol communication through the EAP-API, including SAML, OIDC, and OAuth. To prevent unauthorized integration, the method includes authenticating enterprise ownership of the software application using an OAuth token, an enterprise purchase record, or an enterprise user approval workflow. In some embodiments, the method includes identifying enterprise users authorized to approve integration, notifying the authorized user, and collecting and validating an OAuth token for the requested integration. Additionally, the method includes the steps of automatically validating ownership when the software application is procured through the system itself.

In an embodiment, the method further includes the steps of maintaining a repository of integrated enterprise applications. The repository includes the enterprise standard compliance status for each application, associated extensions implemented, and a risk assessment based on the application's security profile. In some embodiments, the method includes generating risk mitigation recommendations based on periodic compliance assessments. In an embodiment, the method includes the steps of reversing the integration upon detecting a failure event or compliance breach, ensuring enterprise control and system integrity. Furthermore, the method includes the steps of implementing the method in a cloud-based environment supporting multi-tenant architectures, facilitating scalable deployment across enterprise infrastructures.

These and other objects of the present invention will be apparent from review of the following specification and the accompanying drawings.

DETAILED DESCRIPTION OF THE PREFERRED EMBODIMENT

Figure 1:
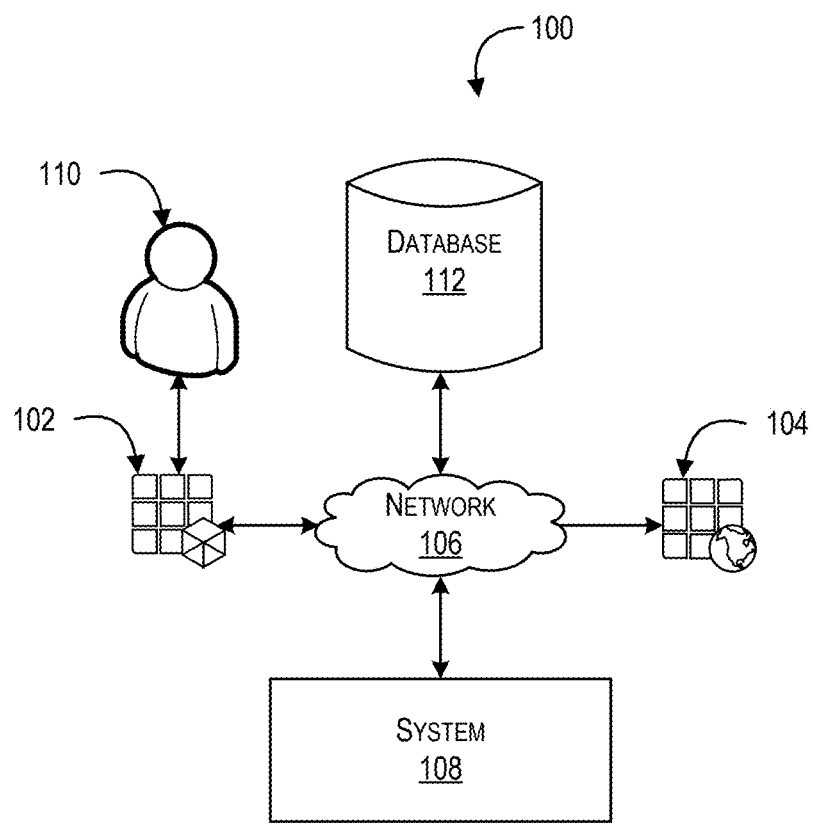
FIG. 1 is an exemplary environment of a system for integrating software applications into enterprise standard control systems, in accordance with an embodiment of the present disclosure.

The detailed description set forth below in connection with the appended drawings is intended as a description of exemplary embodiments in which the presently disclosed disclosure can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed disclosure. However, it will be apparent to those skilled in the art that the presently disclosed disclosure may be practiced without these specific details. In some instances, well-known structures and devices are shown in block diagram form in order to avoid obscuring the concepts of the presently disclosed disclosure.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and/or firmware.

Embodiments of the present disclosure may be provided as a computer program product, which may include a non-transitory, machine-readable storage medium tangibly embodying thereon instructions, which may be used to program the computer (or other electronic devices) to perform a process. The machine-readable medium may include, but is not limited to, fixed (hard) drives, semiconductor memories, such as Read Only Memories (ROMs), Programmable Read-Only Memories (PROMs), Random Access Memories (RAMs), Erasable PROMs (EPROMs), Electrically Erasable PROMs (EEPROMs), flash memory or other types of media/machine-readable medium suitable for storing electronic instructions (e.g., computer programming code, such as software or firmware).

Various methods described herein may be practiced by combining one or more non-transitory, machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection. Based on the disclosure provided herein, one of ordinary skill in the art will appreciate a variety of ways in which connection or coupling exists in accordance with the definition.

Further, the term "module" may be software or hardware particularly programmed to receive an input, perform one or more processes using the input, and provide an output. The input, output, and processes performed by various modules will be apparent to one skilled in the art based on the present disclosure.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular name.

Embodiments of the present disclosure relate to a system and method (together termed as "disclosed mechanism") for integrating software applications into enterprise standard control systems using standardized APIs. The disclosed mechanism enables seamless interoperability between third-party software applications and enterprise control systems while ensuring continuous compliance with enterprise standards.

The disclosed mechanism operates by identifying the enterprise standards associated with an enterprise control system and determining the compatibility of a software application provided by an enterprise application provider (EAP) with the identified standards. Such compatibility assessment includes verifying whether the application supports the protocols, security configurations, and data exchange requirements mandated by the enterprise standards. Upon successful compatibility verification, the disclosed mechanism automates the configuration of the software application to align with the enterprise standards. Further, the disclosed mechanism includes establishing secure communication channels, exchanging authentication tokens, mapping user attributes, and configuring login/logout URLs. The automation ensures that the application integrates seamlessly into the enterprise environment without requiring extensive manual intervention.

To further enhance functionality, the disclosed mechanism supports enterprise standard extensions (EXTs), such as multi-factor authentication (MFA), attribute synchronization, and privileged access management. The extensions are activated when both the enterprise control system and the software application support the specific features, thereby enhancing integration capabilities. The disclosed mechanism also ensures continuous compliance by periodically revalidating the integrated application against evolving enterprise standards. Further, the disclosed mechanism maintains detailed integration records, including metadata, protocol types, exchanged security tokens, and user attribute mappings. Such catalogs serve as a centralized repository for monitoring, auditing, and troubleshooting integration-related activities. To prevent unauthorized integrations, the disclosed mechanism incorporates proof-of-ownership verification. The verification includes authenticating enterprise ownership of the software application through OAuth token-based authentication, enterprise purchase records, or an approval workflow initiated by authorized enterprise users. The authentication ensures that only legitimate enterprise entities can integrate software applications into their control systems.

The disclosed mechanism further enhances enterprise management by providing risk assessment insights, identifying potential vulnerabilities, recommending mitigation strategies, and enabling enterprises to make informed decisions regarding software procurement and integration. By automating the entire integration lifecycle, from compatibility assessment and configuration to deployment, monitoring, and compliance, the disclosed mechanism significantly reduces the time, cost, and effort associated with enterprise software integration. Further, the disclosed mechanism eliminates manual configuration, minimizes human errors, and ensures that every integrated application adheres to enterprise security, governance, and operational standards. In essence, the disclosed mechanism provides enterprises with a comprehensive, scalable, and secure solution for integrating third-party software applications into their existing control systems. It empowers organizations to embrace new technologies while maintaining stringent adherence to enterprise standards, ultimately enhancing operational efficiency, security, and compliance across the enterprise ecosystem.

FIG. 1 is an exemplary environment 100 of a system 108 for integrating software applications into enterprise standard control systems, in accordance with an embodiment of the present disclosure. In an embodiment, the exemplary environment 100 may include a software application 102, an enterprise framework 104, a network 106, the system 108, an EAP owner 110, and a database 112. The system 108 may be implemented on a server that may, without any limitation, include a cloud-based server or an on-premises enterprise server. The interconnected environment 100 may enable seamless and secure integration of third-party software applications into enterprise standard control systems while ensuring continuous compliance with enterprise standards. In general, the system 108 may facilitate communication between the EAP owner 110, the software application 102, the enterprise framework 104, and the database 112 through the network 106. The network 106 may include, without limitation, a direct interconnection, a Local Area Network (LAN), a Wide Area Network (WAN), a wireless network (e.g., using Wireless Application Protocol), the Internet, or any other communication network suitable for secure data transmission. The network 106 may ensure that all interactions, such as transmitting compliance parameters, exchanging integration configurations, and updating the status of integration, are handled securely and reliably. Further, the network 106 may ensure that the software application provided by the EAP owner 110 can be integrated into the enterprise standard framework without manual intervention. The system 108 may act as an intermediary that automates the verification, configuration, and integration process while ensuring that enterprise standards are met. In an embodiment, the EAP owner 110 and the enterprise users may interact with the system 108 through user devices, such as smartphones, tablets, or computers. The user devices may facilitate authorized users to manage software integration, track compliance status, and receive notifications regarding integration outcomes and compliance deviations.

For the purpose of the disclosure, the software application 102 corresponds to a third-party enterprise application that an enterprise seeks to integrate into its control systems. The application may typically be sourced from an Enterprise Application Provider (EAP) and includes metadata indicating the compliance parameters associated with enterprise standards. The EAP owner 110 may represent an authorized user or administrator responsible for managing the integration of the software application into the enterprise framework. The EAP owner 110 may initiate the integration process, provide proof of ownership, and authorize the configuration of the software application within the enterprise ecosystem. The enterprise framework 104 represents the control systems and standards adopted by an enterprise, such as Single Sign-On (SSO), Identity and Access Management (IAM), Privileged Access Management (PAM), and Governance, Risk, and Compliance (GRC). The enterprise standards may ensure uniformity, security, and operational efficiency across the enterprise's software ecosystem. The database 112 may serve as a central repository for storing integration records, compliance statuses, enterprise standard extensions (EXTs), and other relevant metadata. The database 112 may enable continuous monitoring, auditing, and management of integrated applications.

In operation, the EAP owner 110 may interact with the system 108 to initiate the integration of the software application 102 into the enterprise framework 104. The system 108 may first verify the software application for compliance with enterprise standards, determine compatibility based on shared protocols, and automate the configuration process. The system 108 may facilitate exchange of authentication tokens, user attribute mappings, and other configuration parameters with the enterprise framework 104 to establish secure communication between the software application and the enterprise control systems. Once the integration is successfully completed, the system 108 may generate an integration record, cataloging the integrated software application, the applied enterprise standards, and any associated enterprise standard extensions (EXTs). In an embodiment, such record may be stored in the database 112 for future reference, auditing, and periodic revalidation of compliance.

Figure 2:
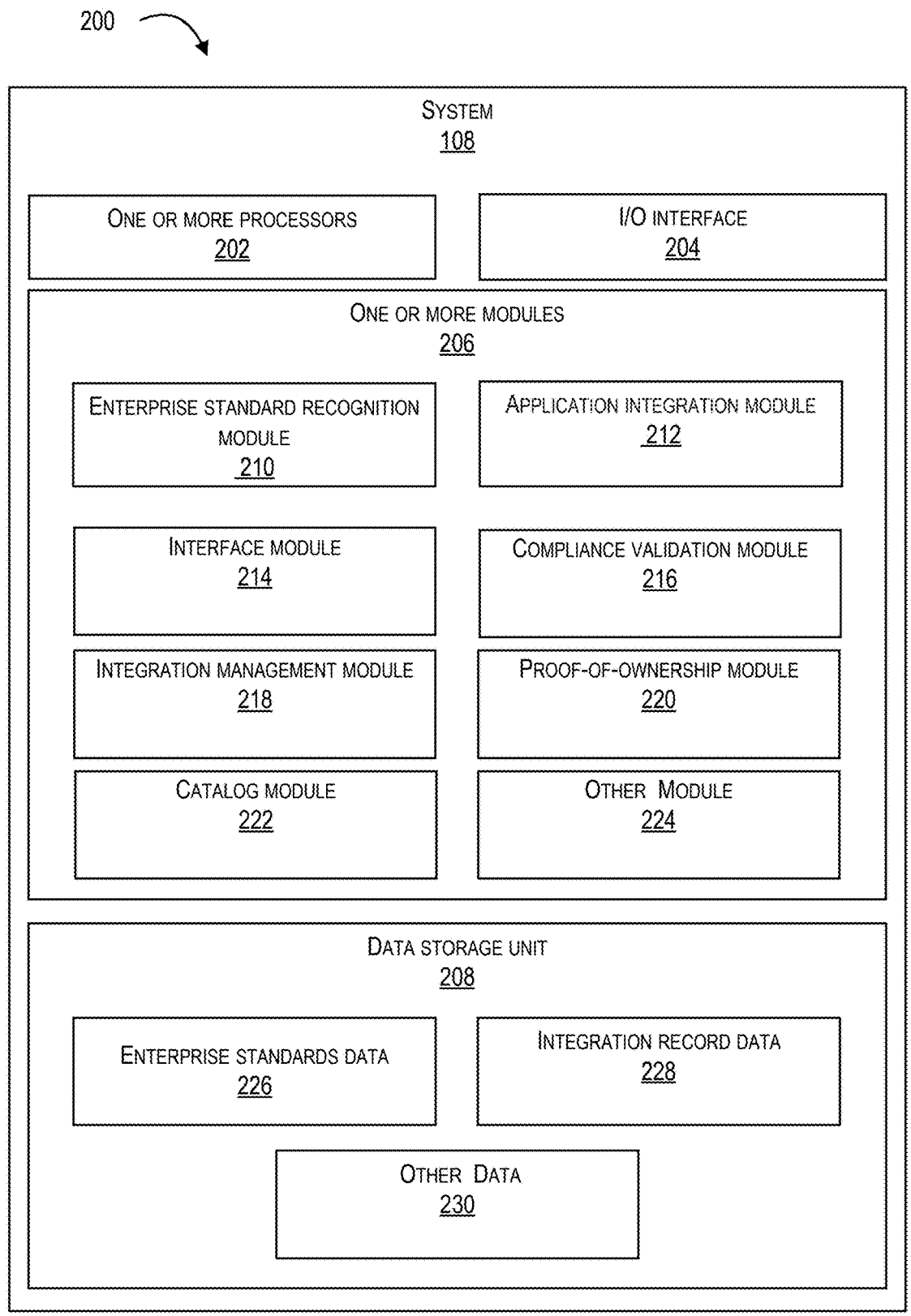
FIG. 2 is a block diagram of the system for integrating the software applications into the enterprise standard control systems, in accordance with an embodiment of the present disclosure.

FIG. 2 is a block diagram 200 of the system 108 for integrating the software applications into the enterprise standard control systems, in accordance with an embodiment of the present disclosure. In an embodiment, the system 108 may include one or more processors 202, an Input/Output (I/O) interface 204, one or more modules 206, and a data storage unit 208. The one or more processors 202 may be implemented as one or more microprocessors, microcomputers, digital signal processors, central processing units, state machines, logic circuitries, and/or any devices that manipulate signals based on operational instructions. Further, the I/O interface 204 may serve as the pivotal bridge connecting the internal processes of the system 108 with its external environment for facilitating the exchange of information between the system 108 and its users or external devices. Furthermore, the I/O interface 204 may contribute to the user experience by providing intuitive means for input, such as through keyboards or touchscreens, and presenting meaningful output via displays or other output devices. In an embodiment, the one or more modules 206 may include an enterprise standard recognition module 210, an application integration module 212, an interface module 214, a compliance validation module 216, an integration management module 218, a proof-of-ownership module 220, a catalog module 222, and any other module 224 essential or required for the working of the system 108. In an embodiment, the data storage unit 208 may include enterprise standard data 226, integrated record data 228, and any other data 230 required for the working of the system 108. In an embodiment of the present disclosure, the one or more processors 202 and the data storage unit 208 may form a part of a chipset installed in the system 108. In another embodiment of the present disclosure, the data storage unit 208 may be implemented as a static memory or a dynamic memory. In an example, the data storage unit 208 may be internal to the system 108, such as an onside-based storage. In another example, the data storage unit 208 may be external to the system 108, such as cloud-based storage. Further, the one or more module 206 may be communicatively coupled to the data storage unit 208 and the one or more processor 202 of the system 108. The one or more processors 202 may be configured to control the operations of the one or more modules 206.

In an embodiment, the enterprise standard recognition module 210 may identify one or more enterprise standards associated with an Enterprise Standard Provider (ESP). The enterprise standards may include, but are not limited to, frameworks for information security, identity management, privileged access, governance, and risk compliance, which enterprises adopt to streamline and secure their software ecosystems. The enterprise standard recognition module 210 may operate by analyzing metadata, configuration parameters, and protocol definitions provided by the enterprise standard provider. The metadata may define the specific protocols, authentication mechanisms, and data exchange requirements required for integrating third-party software applications with enterprise control systems. In an embodiment, the enterprise standard recognition module 210 may support both open standards (such as SAML, OIDC, and OAuth) and proprietary protocols, ensuring broad compatibility with diverse enterprise infrastructures. Further, the enterprise standard recognition module 210 may ensure that the system 108 recognizes the specific enterprise protocols and compliance requirements that govern the integration of software applications within an enterprise ecosystem. The compliance requirements may include authentication workflows, user attribute mappings, access control policies, and security tokens, which may be essential for establishing secure and standardized integration pathways.

In an embodiment, the enterprise standard recognition module 210 may retrieve enterprise standard parameters from local configuration files, remote enterprise directories, or ESP platforms using programmatic interfaces, such as RESTful APIs, SOAP-based web services, or GraphQL endpoints. Additionally, the enterprise standard recognition module 210 may support dynamic standard detection. The standard detection may include periodically scanning the enterprise ecosystem for newly adopted standards, updated protocols, or revised compliance frameworks. Upon detecting any changes, the enterprise standard recognition module 210 may trigger an update process, ensuring that the system 108 remains aligned with the enterprise's evolving control requirements. In an embodiment, the enterprise standard recognition module 210 may further analyze versioning information associated with the identified enterprise standards. Such analysis may ensure compatibility between the enterprise control system and the software application being integrated, particularly when enterprise standards evolve or when multiple protocol versions coexist within the enterprise infrastructure.

In an embodiment, the enterprise standard recognition module 210 may handle enterprise-specific extensions to recognized standards. The extensions may include attribute synchronization, privileged access management, role-based access control (RBAC), and multi-factor authentication (MFA). The enterprise standard recognition module 210 may identify such extensions and record corresponding parameters. In some embodiments, the enterprise standard recognition module 210 may leverage machine learning algorithms or rule-based engines to predict compatibility between enterprise standards and third-party software applications.

In an embodiment, the application integration module 212 may identify one or more software applications provided by an Enterprise Application Provider (EAP) for integration with the identified enterprise standards. The software applications may include cloud-based services, on-premises enterprise solutions, productivity tools, security platforms, and other third-party applications commonly utilized by enterprises for business operations and service delivery. The identification process may include analyzing metadata associated with the software application, including application identifiers, provider details, supported protocols, configuration parameters, and security compliance information. Further, the application integration module 212 may facilitate the detection and onboarding of third-party software applications requiring integration into an enterprise's existing control systems. This may be achieved through automated discovery mechanisms, user-initiated input, or API-based detection workflows. In an embodiment, the application integration module 212 may interact with enterprise application directories, software repositories, or procurement platforms to identify newly acquired software applications and initiate the integration process. Additionally, the application integration module 212 may retrieve integration-related metadata from the EAP, such as authentication requirements, API endpoints, user attribute mappings, and compliance certificates, ensuring that the application meets enterprise-specific standards before integration.

In an embodiment, the application integration module 212 may further assess the compatibility of the identified software application with the enterprise standards. The compatibility assessment may include analyzing shared protocols, supported authentication mechanisms, and the application's ability to exchange data securely with the enterprise control system. The application integration module 212 may also evaluate whether the software application supports specific enterprise standard extensions (EXTs), such as multi-factor authentication (MFA), attribute synchronization, or privileged access management. If the application meets the enterprise standards and associated extensions, the application integration module 212 may proceed with the integration workflow. In an embodiment, the application integration module 212 may facilitate the registration and cataloging of detected software applications within the enterprise system. The registration process may include associating each application with its corresponding enterprise application provider, recording integration parameters, and updating the system 108 centralized catalogs of integrated applications. In some embodiments, the application integration module 212 may support version tracking of software applications, ensuring that integration remains valid even when the software is updated or modified. The versioning capability facilitates the system 108 to trigger revalidation checks and reconfiguration workflows whenever the application undergoes significant changes.

In an embodiment, the application integration module 212 may facilitate sandbox testing of newly identified applications, allowing enterprises to simulate integration scenarios in a controlled environment before deploying the software into production. The testing process may include validating configuration parameters, detecting potential conflicts, and ensuring that the integration does not disrupt existing enterprise workflows. In some embodiments, the application integration module 212 may facilitate rollback mechanisms, enabling the system 108 to revert to a previous state if the integration process encounters errors or fails to meet enterprise standards. In an embodiment, the application integration module 212 may interact with enterprise marketplaces, application catalogs, and procurement platforms, allowing enterprises to streamline the acquisition and onboarding of third-party software. The application integration module 212 may automatically initiate the integration process upon successful procurement, reducing the administrative burden on enterprise IT teams. Such automated onboarding process ensures that newly acquired applications are promptly integrated into the enterprise control system while maintaining compliance with enterprise standards.

In an embodiment, the interface module 214 may facilitate seamless communication between the ESP and the EAP. The interface module 214 may ensure that both the enterprise control systems and the software applications being integrated exchange data securely, efficiently, and in accordance with enterprise standards. Further, the interface module 214 may provide a standardized communication framework that bridges the gap between disparate systems, enabling interoperability without requiring extensive manual configuration. Furthermore, the interface module 214 may include an ESP-API interface for facilitating communication with the enterprise standard provider and an EAP-API interface for facilitating communication with the enterprise application provider. Such interfaces may serve as dedicated communication channels that streamline the exchange of integration parameters, compliance metadata, user attribute mappings, and authentication tokens. The ESP-API interface may interact with the ESP's enterprise control system, enabling the system 108 to retrieve enterprise standards, validate compliance parameters, and configure enterprise-specific policies. Similarly, the EAP-API interface may interact with the EAP's software platform, facilitating the exchange of application-specific configurations, authentication workflows, and user access controls. Moreover, the interface module 214 may manage error handling, request retries, and timeout management to ensure robust communication between the ESP and EAP. Such resilience may ensure that temporary network failures, protocol mismatches, or incomplete data transmissions do not disrupt the integration process. Additionally, the interface module 214 may implement rate limiting and API throttling to prevent excessive API calls, ensuring optimal system performance and resource utilization.

In an embodiment, the interface module 214 may facilitate dynamic schema adaptation, wherein it adjusts the API payload structure based on the specific requirements of the enterprise standard and the software application. Such dynamic adaptation may ensure that the data exchanged between the ESP and EAP adheres to the expected format, minimizing integration errors and reducing manual intervention. In some embodiments, the interface module 214 may include API version management, enabling the system to maintain backward compatibility with previous API versions while supporting new API features and enhancements. In an embodiment, the interface module 214 may facilitate bidirectional communication, enabling both the ESP and EAP to exchange real-time status updates, configuration changes, and compliance alerts. The bidirectional communication ensures that any modifications made to the enterprise control system are promptly reflected in the integrated software application and vice versa, maintaining synchronization across the enterprise ecosystem. In an embodiment, the interface module 214 may support event-driven communication, wherein API requests and responses are triggered based on specific events, such as user provisioning, access revocation, or enterprise policy updates. The event-driven approach may optimize operational efficiency by automating critical workflows and reducing the need for manual intervention. In an embodiment, the interface module 214 may facilitate batch processing of API requests, enabling the system 108 to handle large volumes of data efficiently. This capability ensures that enterprises can integrate multiple software applications simultaneously without compromising system performance or integration timelines.

In an embodiment, the compliance validation module 216 may verify whether the enterprise application provider (EAP) satisfies one or more enterprise standards by executing a compliance test. The compliance validation module 216 may play a critical role in ensuring that third-party software applications meet the specific requirements defined by the enterprise standard provider (ESP) before integration. The compliance test may include examining the application's adherence to industry-standard protocols, data exchange formats, authentication mechanisms, and security configurations, ensuring that the software application aligns with enterprise policies and does not introduce vulnerabilities into the enterprise ecosystem.

In an embodiment, the compliance validation module 216 may determine the compatibility between the ESP and EAP based on shared protocols. The compatibility assessment may include verifying whether the software application supports enterprise-standard protocols such as SAML, OpenID Connect (OIDC), OAuth, TLS, and other authentication and communication frameworks adopted by the enterprise control system. The compliance validation module 216 may further examine user attribute mappings, access control policies, token exchange mechanisms, and encryption standards to ensure that the integrated application complies with enterprise-specific security and operational requirements.

In an embodiment, the compliance validation module 216 may evaluate the integrity and completeness of metadata associated with the software application, including configuration parameters, service endpoints, and API documentation. The metadata analysis may ensure that the software application can effectively interact with the enterprise control system while adhering to defined standards. If discrepancies or gaps are detected, the compliance validation module 216 may flag the integration as non-compliant and prevent further onboarding until the issues are resolved. In some embodiments, the compliance validation module 216 may include an automated test suite to periodically revalidate the compliance of the integrated software application. The periodic revalidation may ensure that the software application continues to meet enterprise standards even after deployment, particularly when enterprise standards evolve, software updates are applied, or configuration changes occur. The test suite may simulate real-world integration scenarios, verify protocol adherence, and generate detailed compliance reports, enabling enterprises to maintain continuous oversight of integrated applications. If the integrated application fails a periodic revalidation test, the system 108 may suspend or terminate the integration to maintain enterprise security and operational integrity. In such cases, the compliance validation module 216 may trigger an automated rollback process, restoring the enterprise control system to its previous state and preventing potential security breaches or operational disruptions. Additionally, the compliance validation module 216 may generate compliance deviation alerts, notifying enterprise administrators of the failed validation and providing detailed remediation steps for resolving the identified issues.

In an embodiment, the integration management module 218 may automate the integration of the software application into the enterprise standard control system upon successful compliance validation. The integration management module 218 may play a pivotal role in streamlining the onboarding process, ensuring that once a software application meets enterprise standards, the application is seamlessly integrated into the enterprise ecosystem without requiring extensive manual intervention. The integration process facilitated by the integration management module 218 may ensure consistency, security, and operational efficiency across the enterprise infrastructure. Further, the integration management module may generate an integration record cataloging the integrated software application, the enterprise standard applied, and any associated enterprise standard extensions (EXTs). The integration record may include detailed metadata, such as protocol type, authentication tokens exchanged, user attribute mappings, and login/logout URLs. By maintaining a comprehensive record of each integration, the integration management module 218 may facilitate enterprises to track and audit integrated applications, ensuring continued adherence to enterprise standards and simplifying future system 108 upgrades or migrations.

In some embodiments, the integration management module 218 may automatically configure an enterprise standard extension only when both the ESP and EAP support the extension. The extensions (EXTs) may include advanced functionalities such as multi-factor authentication (MFA), attribute synchronization, privileged access management, and adaptive access controls. When the integration management module 218 detects mutual support for a specific extension, it initiates an automated configuration workflow, ensuring that the extension is implemented without additional administrative effort. If either the ESP or EAP does not support a particular extension, the module may bypass the extension configuration while maintaining the core integration. Further, the integration management module 218 may include a rollback mechanism to reverse the integration in response to a failure event or compliance breach. In an embodiment, the rollback process may include restoring the system 108 to pre-integration state, including removing access credentials, revoking security tokens, and updating enterprise directories to reflect the removal of the non-compliant application.

In an embodiment, the proof-of-ownership module 220 may authenticate enterprise ownership of the software application before integration. The proof-of-ownership module 220 may ensure that only authorized enterprise entities integrate software applications into the enterprise control system, preventing unauthorized or rogue software from being onboarded. The ownership verification process may include analyzing metadata associated with the software application, such as the enterprise license, provider details, and purchase history, to confirm the legitimacy of the integration request. The proof-of-ownership module 220 may verify ownership using OAuth token-based authentication, enterprise purchase records, and/or an enterprise user approval workflow. In OAuth-based authentication, the proof-of-ownership module 220 may request an authorization token from the enterprise application provider, confirming that the integration is initiated by an authorized user. Similarly, the proof-of-ownership module 220 may cross-reference enterprise purchase records to validate that the enterprise has acquired the software through legitimate channels. In user approval workflows, the proof-of-ownership module 220 may initiate an approval request, requiring an authorized enterprise user to confirm ownership before proceeding with integration.

In some embodiments, the proof-of-ownership module 220 may include an approval workflow engine to identify one or more enterprise users authorized to approve integration. The approval workflow engine may automatically notify the authorized user, providing them with details about the integration request, including the software application, enterprise standards involved, and any associated extensions (EXTs). Upon receiving user approval, the proof-of-ownership module 220 may collect and validate the OAuth token for the requested integration. Additionally, the proof-of-ownership module 220 may automatically validate ownership when the software application is procured directly through the system 108, streamlining the verification process and ensuring seamless integration without manual intervention.

In an embodiment, the catalog module 222 may maintain a repository of integrated enterprise applications, serving as a centralized database for tracking and managing all software applications integrated into the enterprise control system. The repository may store detailed records for each integrated application, including its enterprise standard compliance status, integration parameters, and associated enterprise standard extensions (EXTs). The catalog may ensure that enterprises have complete visibility into their software ecosystem, enabling efficient monitoring, auditing, and management of integrated applications. Further, the catalog module 222 may record a risk assessment profile for each integrated application, evaluating potential vulnerabilities based on the application's security posture, data exchange protocols, and access control configurations. The risk assessment may be based on predefined enterprise policies, industry standards, and historical compliance data. By maintaining an up-to-date risk profile for each application, the catalog module 222 may ensure that enterprises can identify and address potential security gaps before they impact operations. In some embodiments, the catalog module 222 may generate risk mitigation recommendations based on periodic compliance assessments. The recommendations may include actionable insights, such as updating access controls, applying software patches, or modifying integration configurations to align with updated enterprise standards. Further, the catalog module 222 may trigger alerts when an application falls out of compliance, enabling enterprises to proactively address potential vulnerabilities and maintain continuous adherence to enterprise standards without disrupting business operations.

Figure 3A:
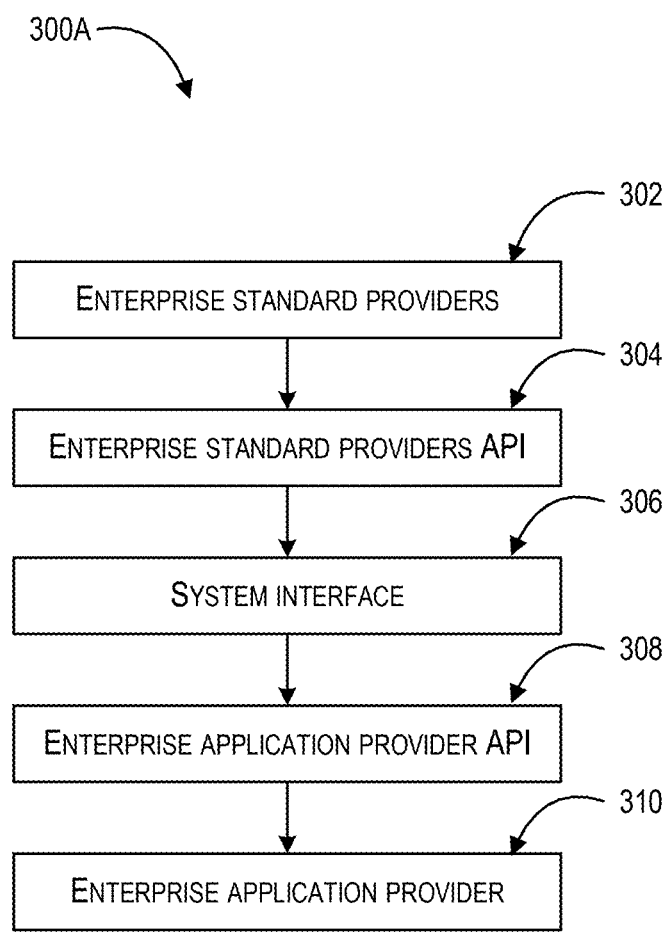
FIGS. 3A-3B are flow diagram and block diagram showing communication between enterprise standard providers and enterprise application providers, in accordance with an embodiment of the present disclosure.
Figure 3B:
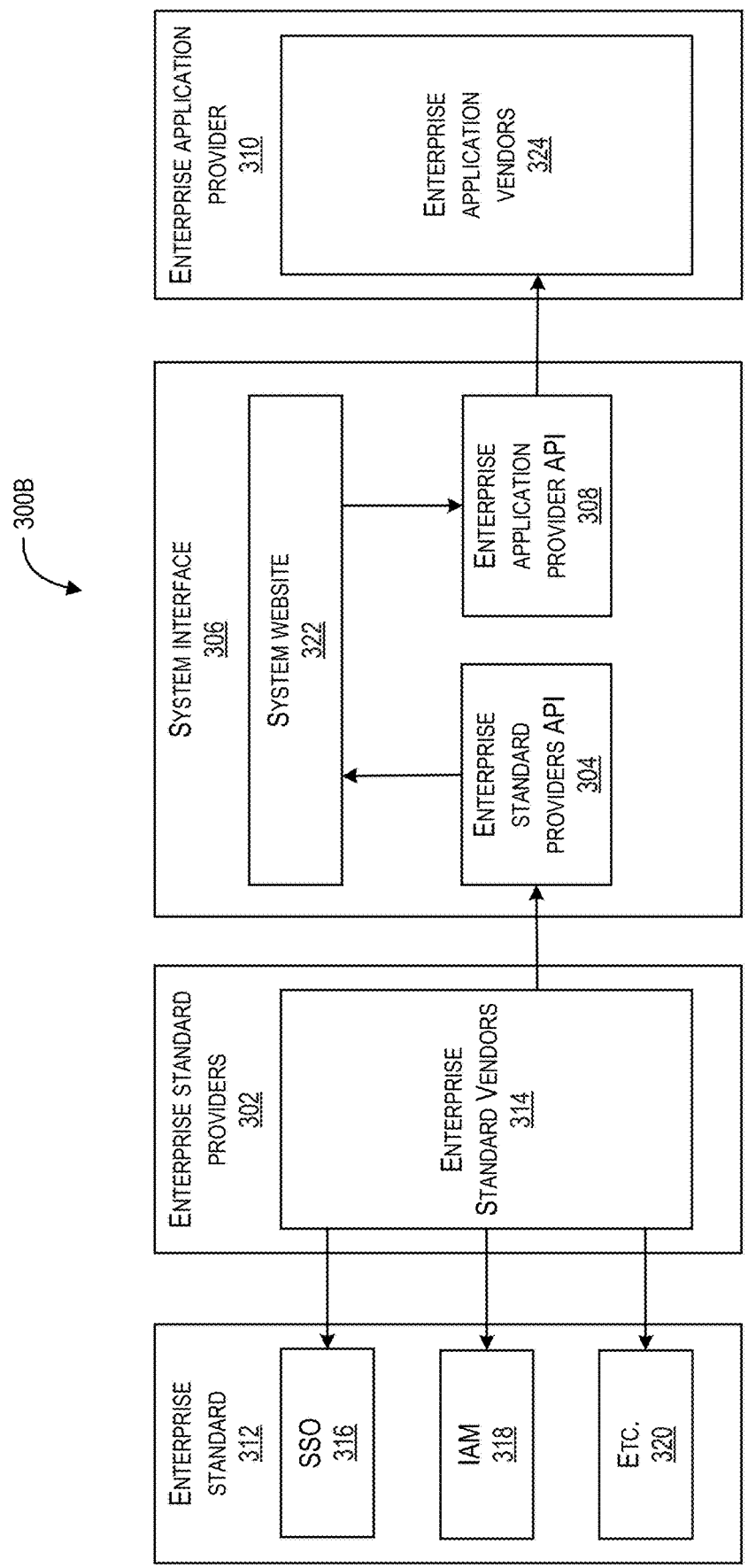

FIGS. 3A-3B are flow diagram 300A and block diagram 300B, respectively, showing communication between enterprise standard providers 302 and enterprise application providers 310, in accordance with an embodiment of the present disclosure.

Referring to FIG. 3A, the flow diagram 300A illustrates the communication path from the enterprise standard providers 302 to the enterprise application providers 310 through the system interface 306. The flow begins with the enterprise standard providers 302, which represent vendors offering enterprise control solutions such as Single Sign-On (SSO), Identity and Access Management (IAM), Privileged Access Management (PAM), and Governance, Risk, and Compliance (GRC) platforms. The enterprise standard providers 302 expose corresponding functionalities through the enterprise standard providers API 304, which serves as the communication bridge between the ESP and the system interface 306. The system interface 306 may act as an intermediary layer, facilitating bidirectional communication between the ESP 302 and the EAP 310. Further, the system interface 306 may ensure that the integration parameters, compliance requirements, and security configurations defined by the enterprise standards are consistently applied during the onboarding process. The enterprise application provider API 308, in turn, may connect the EAP 310 to the system interface 306, ensuring that the software application can exchange integration-related data, user attributes, authentication tokens, and configuration settings with the enterprise control system. Such end-to-end communication flow may ensure that the enterprise application aligns with enterprise standards before, during, and after integration.

As depicted in FIG. 3B, the enterprise standard 312 may represent various enterprise control frameworks, including SSO 316, IAM 318, and other standards 320 (etc. 320), commonly adopted by enterprises to streamline user authentication, access management, and security compliance. The enterprise standard 312 may be implemented and maintained by enterprise standard vendors 314, who may act as the enterprise standard providers 302. The enterprise standard vendors 314 expose their integration capabilities through the enterprise standard providers API 304, facilitating the system 108 to retrieve enterprise-specific requirements, protocols, and configurations. Further, the system interface 306 may play a pivotal role in managing communication between the enterprise standard providers 302 and the enterprise application providers 310. Such system interface 306 may include the system website 322, which provides a user-facing portal for enterprise administrators to initiate, configure, and monitor application onboarding. The enterprise standard providers API 304 facilitates real-time retrieval of enterprise standards, while the enterprise application provider API 308 enables the system 108 to exchange integration parameters with third-party software applications. Such dual-API architecture may ensure that both the ESP 302 and the EAP 310 communicate seamlessly through the system interface 306 without requiring custom configurations or manual intervention.

In an embodiment, the enterprise application provider 310 may represent the third-party software vendor whose application is being integrated into the enterprise control system. The vendors, represented by the enterprise application vendors 324, may expose their integration endpoints through the enterprise application provider API 308, facilitating the system 108 to access application metadata, configuration parameters, and user access controls. The system interface 306 may ensure that the integration process is aligned with enterprise standards, facilitating secure communication between the EAP 310 and the ESP 302 throughout the integration lifecycle. In an embodiment, the system interface 306 may further support dynamic configuration adjustments, allowing enterprises to modify integration parameters in real-time based on evolving enterprise standards or application updates. Such flexibility may ensure that integrated applications remain compliant with enterprise policies while minimizing operational disruptions. Additionally, the system interface 306 may facilitate error handling, request retries, and timeout management, ensuring robust communication between the ESP and EAP, even in the event of temporary network failures or protocol mismatches.

Figure 4:
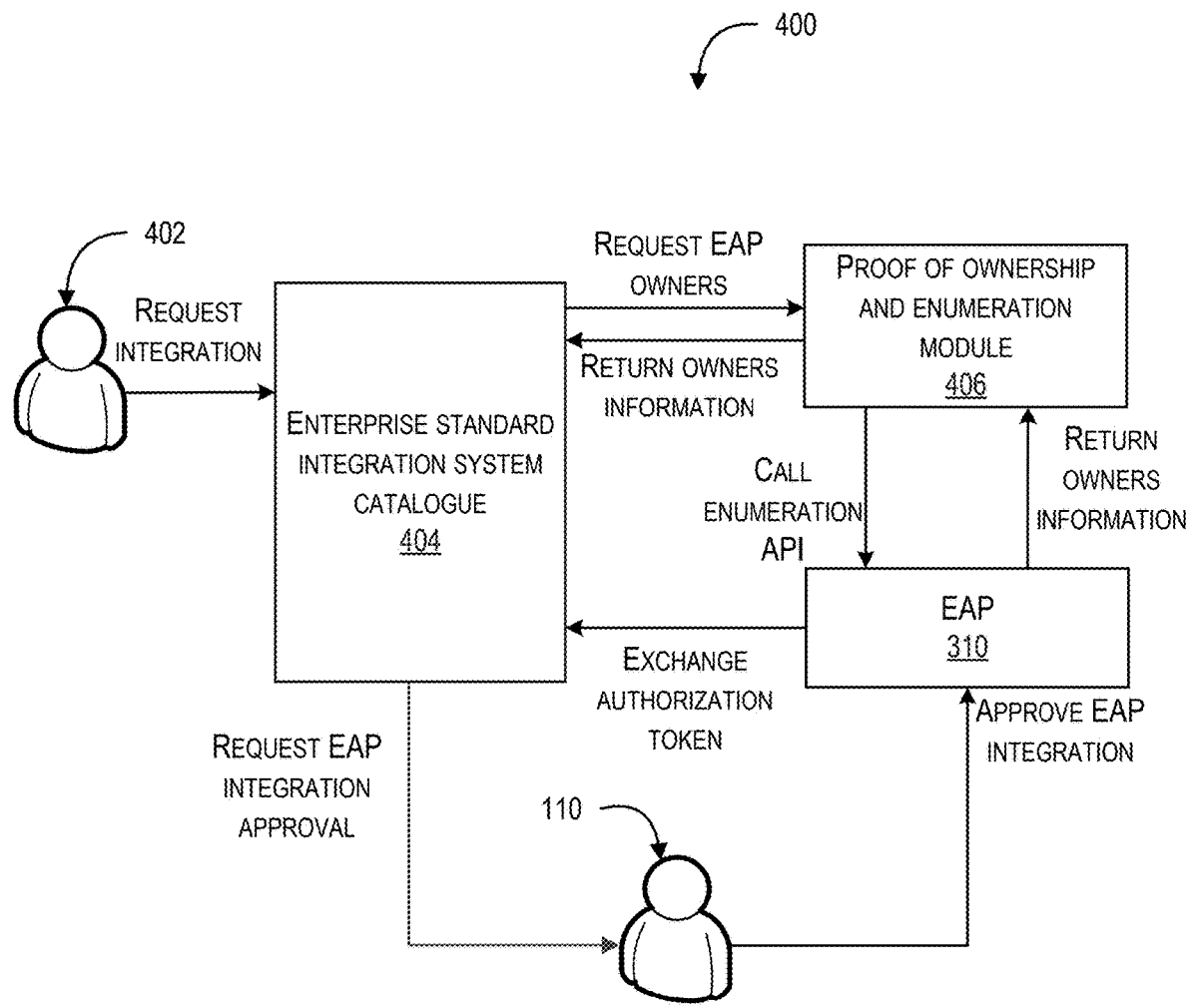
FIG. 4 is a flow diagram illustrating the proof-of-ownership and enumeration process for enterprise application integration, in accordance with an embodiment of the present disclosure.

FIG. 4 is a flow diagram 400 illustrating the proof-of-ownership and enumeration process for enterprise application integration, in accordance with an embodiment of the present disclosure. The proof-of-ownership and enumeration process may be facilitated through the Enterprise Standard Integration System (ESIS) catalog 404, which interacts with the Enterprise Application Provider (EAP) 310, the Proof-of-Ownership and Enumeration (POE) module 406, and an EAP owner 110 to authenticate ownership and approve the integration workflow.

The process begins when an ESIS user 402 submits a request for integration to the ESIS catalog 404, indicating the desire to integrate a specific software application provided by the EAP 310. Upon receiving the integration request, the ESIS catalog 404 may initiate the ownership verification process by querying the POE module 406 to identify the authorized owners associated with the requested software application. The integration request may ensure that only legitimate enterprise users can authorize the integration, thereby safeguarding the enterprise ecosystem from unauthorized software onboarding.

To facilitate the verification process, the POE module 406 may call an enumeration API exposed by the EAP 310, requesting a list of users authorized to approve the integration. In response, the EAP 310 returns ownership information, including user identities, roles, and authorization levels. The ownership information may be relayed by the POE module 406 back to the ESIS catalog 404, enabling the system 108 to determine the appropriate approval pathway. If the user initiating the request is an authorized owner, they can directly log in to the EAP 310 and approve the integration by providing an OAuth token to the ESIS catalog 404. In an alternative approach, if the software application was procured through the ESIS platform, ownership is automatically established as part of the procurement process, bypassing the need for manual approval. However, if the ESIS user 402 is not authorized to approve the integration, the ESIS catalog 404 requests an EAP integration approval from an authorized EAP owner 110. The EAP owner 110 may evaluate the integration parameters and, if satisfied, approve the integration by providing an OAuth token to the ESIS catalog 404. The token-based approval may ensure that the integration request is legitimate and originates from an enterprise-authorized user.

Upon successful ownership verification and receipt of the OAuth token, the ESIS catalog 404 may exchange the token with the EAP 310, signaling that the integration request has been authorized. The EAP 310 may proceed with the final integration, ensuring that the software application is securely onboarded into the enterprise control system while maintaining continuous compliance with enterprise standards. The end-to-end verification workflow ensures that only authorized applications, verified through enterprise ownership credentials, can be integrated into the enterprise environment.

Figure 5:
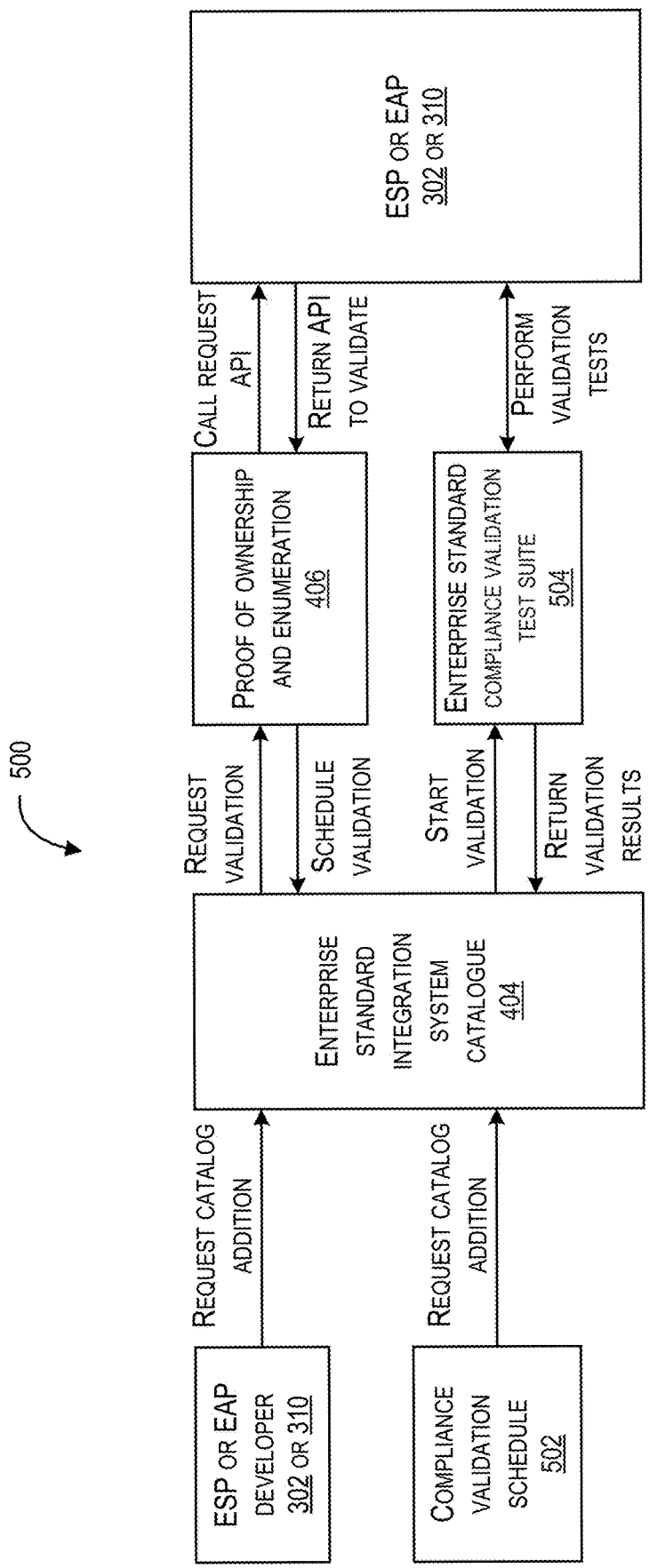
FIG. 5 is a block diagram illustrating the Enterprise Standard Compliance Validation (ESCV), in accordance with an embodiment of the present disclosure.

FIG. 5 is a block diagram 500 illustrating the Enterprise Standard Compliance Validation (ESCV), in accordance with an embodiment of the present disclosure. The ESCV ensures that both Enterprise Standard Providers (ESPs) 302 and Enterprise Application Providers (EAPs) 310 meet the required enterprise standards before being added to the Enterprise Standard Integration System (ESIS) catalogue 404. The validation process may ensure that software applications and enterprise control systems comply with established standards, mitigating security risks and ensuring operational integrity.

The process may begin when an ESP or EAP developer 302 or 310 submits a request for catalog addition to the ESIS catalogue 404, indicating the intent to onboard a new enterprise application or control system. The request may trigger the ownership verification process, where the ESIS catalogue 404 may send a validation request to the Proof-of-Ownership and Enumeration (POE) module 406. The POE module 406 may query the ESP or EAP 302 or 310 by calling an enumeration API and requesting the list of authorized users associated with the application. In response, the ESP 302 or EAP 310 may return ownership information, confirming that the requesting entity has the authority to proceed with the catalog addition. Once ownership is established, the ESIS catalogue 404 may schedule a compliance validation using the Enterprise Standard Compliance Validation (ESCV) test suite 504. The ESCV test suite 504 may evaluate whether the ESP 302 or EAP 310 satisfies the enterprise standards and supports the necessary enterprise standard extensions (EXTs). The ESIS catalogue 404 may initiate the validation process by triggering the ESCV test suite 504, which retrieves the required validation APIs from the ESP 302 or EAP 310 and executes a series of automated tests to assess compliance.

During the validation process, the ESCV test suite 504 may interact with the ESP 302 or EAP 310 to perform validation tests, verifying whether the application adheres to predefined enterprise standards. The validation tests may assess various parameters, including protocol adherence, user attribute mappings, authentication workflows, and security token exchanges, ensuring that the ESP 302 or EAP 310 may seamlessly integrate into the enterprise control system without compromising security or operational efficiency. Upon completing the validation tests, the ESCV test suite 504 may return the validation results to the ESIS catalogue 404, which records the compliance status of the ESP 302 or EAP 310. Upon passing the validation, the application may be added to the ESIS catalogue 404, allowing enterprises to integrate the software with confidence. If the ESP 302 or EAP 310 fails the validation, the ESIS catalogue 404 may generate a compliance failure report, highlighting the specific test cases that were unsuccessful and providing recommendations for remediation. In an embodiment, the ESIS catalogue 404 may support periodic revalidation through the compliance validation schedule 502, ensuring that integrated ESPs and EAPs continue to meet enterprise standards over time. The ESIS catalogue 404 may automatically schedule revalidation tasks based on predefined compliance schedules and trigger validation workflows via the applicable APIs.

Figure 6:
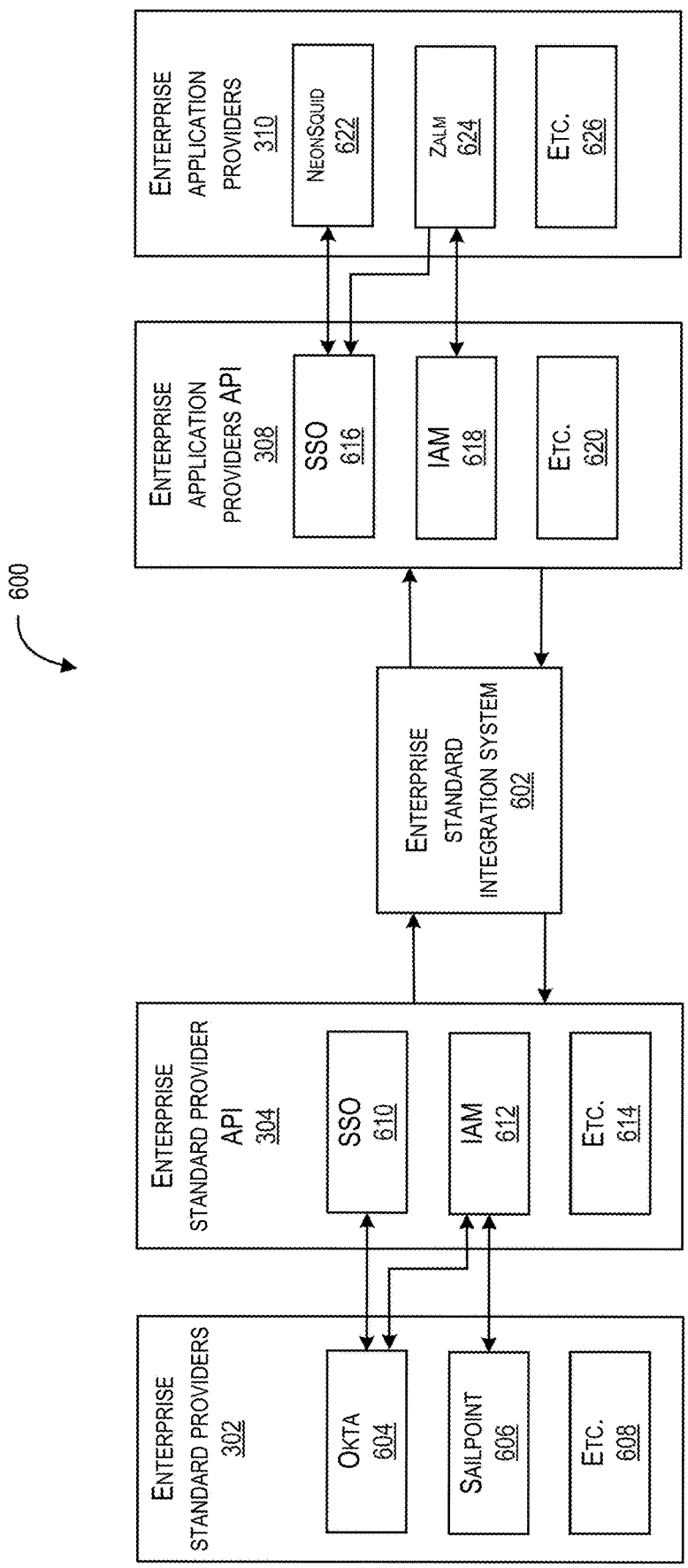
FIG. 6 is a block diagram illustrating EAP automation integration process, in accordance with an embodiment of the present disclosure.

FIG. 6 is a block diagram 600 illustrating EAP automation integration process, in accordance with an embodiment of the present disclosure. The automation process may ensure seamless onboarding of the Enterprise Application Provider (EAP) 310 into the enterprise control system after verifying ownership and obtaining authorization for integration with the Enterprise Standard Provider (ESP) 302. The automated integration workflow may eliminate manual intervention, enhancing efficiency, accuracy, and compliance with enterprise standards.

The automation process may begin after the proof-of-ownership and integration approval have been established through the ESIS. As depicted in FIG. 6, the ESP 302 may represent enterprise standard providers 302 such as Okta 604, SailPoint 606, and others 608, which implement control frameworks like Single Sign-On (SSO) 610, Identity and Access Management (IAM) 612, and other standards 614. The enterprise standard providers 302 may expose corresponding functionalities through the Enterprise Standard Provider API 304, which facilitates communication between the ESP and the Enterprise Standard Integration System (ESIS) 602. Once an EAP 310 seeks integration with the enterprise control system, the ESIS 602 may initiate the automated integration process by identifying shared protocols between the ESP 302 and the EAP 310. Such identification may be achieved through the Enterprise Standard Provider API 304 and the Enterprise Application Provider API 308, which may serve as communication gateways between the ESP 302, EAP 310, and the ESIS 602. The EAP 310 may include third-party software vendors such as NeonSquid 622, Zalm 624, and others 626 (etc. 626), each providing applications that require secure onboarding into the enterprise environment. The ESIS 602 may determine the underlying protocols shared by the ESP 302 and the EAP 310, ensuring that both entities support the same enterprise standards and extensions (EXTs). For example, if an SSO provider 610 has already been integrated into the enterprise control system, the ESIS 602 may verify whether the EAP 310 supports the same SSO protocol, such as SAML, OIDC, or OAuth. Additionally, the system 108 may check for support of attribute synchronization EXT, ensuring that user attributes can be synchronized between the enterprise directory and the EAP application.

Upon verifying protocol compatibility, the ESIS 602 may proceed with the automated configuration of both the ESP 302 and EAP 310. The system 108 may initiate the configuration of the EAP 310 via the EAP-API 308, establishing secure communication channels, exchanging user attribute mappings, and configuring authentication workflows. Simultaneously, the system 108 may initiate the configuration of the ESP 302 via the ESP-API 304, ensuring that the enterprise control system manages the EAP 310 in accordance with enterprise standards and security policies. Once the configuration is complete, the ESIS 602 may catalogue the integration outcome, recording essential metadata such as the enterprise standard applied, protocols used, authentication tokens exchanged, user attribute mappings, and any enterprise standard extensions (EXTs) implemented. The cataloging may ensure that the enterprise can monitor, audit, and manage the integrated application throughout its lifecycle. In an embodiment, the ESIS 602 may also facilitate continuous monitoring of the integrated EAP, ensuring that the application remains compliant with enterprise standards even as software updates, protocol changes, or configuration modifications occur. If the EAP undergoes significant updates, the ESIS 602 may trigger a revalidation process, ensuring that the integration remains secure and operationally efficient.

FIGS. 7A-7D are exemplary user interfaces 700A-700D for managing product standards, application integration, and enterprise compliance ratings, in accordance with an embodiment of the present disclosure. The user interfaces 700A-700D may facilitate enterprise administrators to evaluate, select, and integrate third-party software applications based on compliance status, risk assessment, and enterprise standard adherence.

Figure 7A:
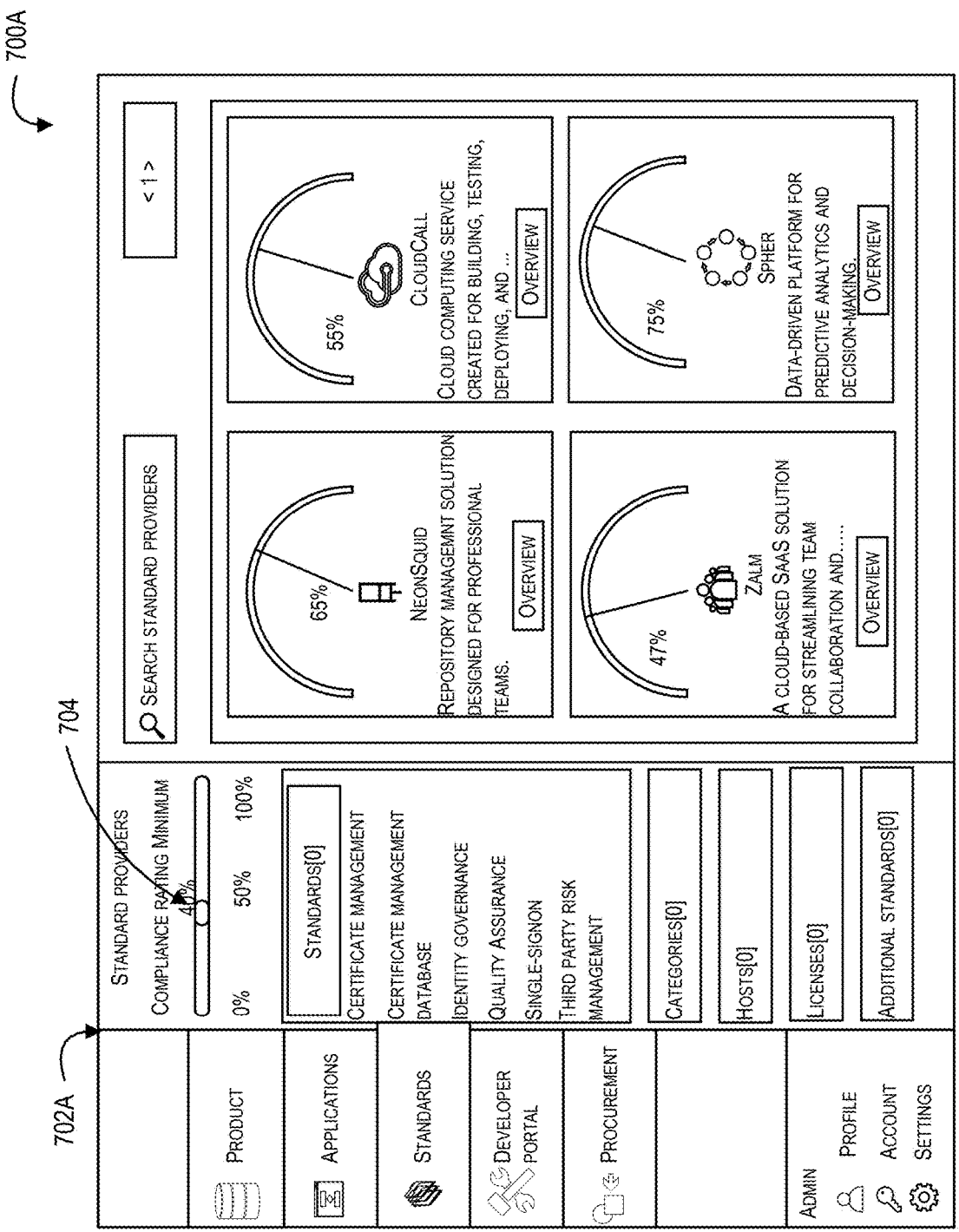
FIGS. 7A-7D are exemplary user interfaces for managing product standards, application integration, and enterprise compliance ratings, in accordance with an embodiment of the present disclosure.

In an embodiment, referring to FIG. 7A, the user interface 700A displays a product catalog and compliance ratings for various standard providers. The sidebar 702A on the left may include menu options for managing products, applications, standards, developer portal, and procurement. The compliance rating slider 704 may allow users to set a minimum threshold for evaluating standard providers based on compliance scores. In this example, the slider is set to 40%, ensuring that only providers meeting or exceeding this threshold are displayed. The search bar enables users to find specific standard providers, while the main panel displays a list of providers such as NeonSquid, CloudCall, Zalm, and Spher, each with an associated compliance rating. The overview button allows users to access detailed product information for each provider.

Figure 7B:
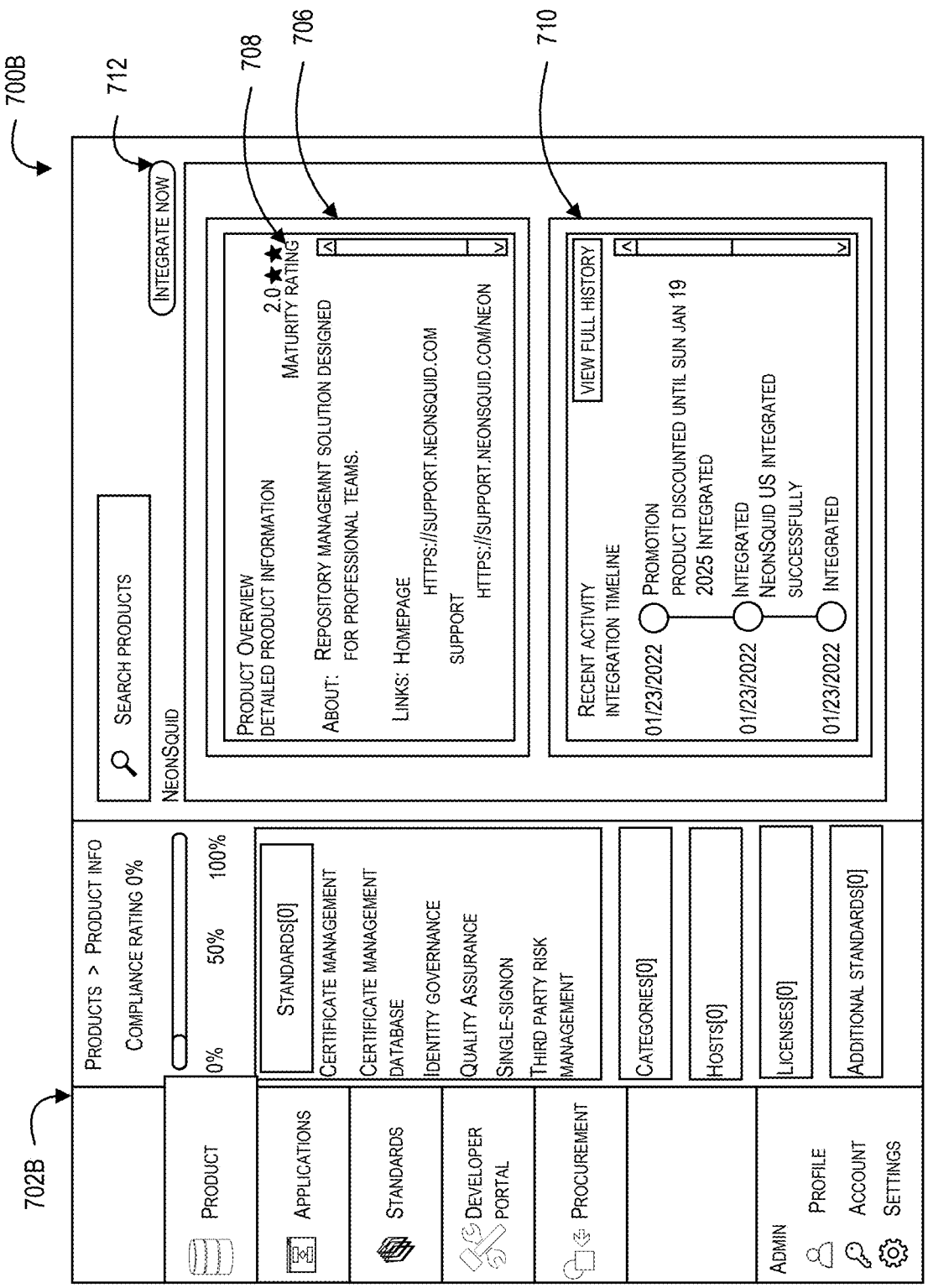

In an embodiment, referring to FIG. 7B, the user interface 700B for detailed product information and integration workflows, may include a selected product, NeonSquid, a repository management solution for professional teams. The users may select the product section from the sidebar 702B to access such functionality. The product overview section 706 may provide comprehensive information about the application, including the product description, homepage link, and support link. The maturity rating 708 may indicate the application's readiness for enterprise deployment, rated as 2.0 stars in this example. Below the product overview, the recent activity section 710 displays an integration timeline, detailing significant events such as promotions, successful integrations, and compliance updates. The "Integrate Now" button 712 may facilitate the users to initiate the integration process directly from the product page.

Figure 7C:
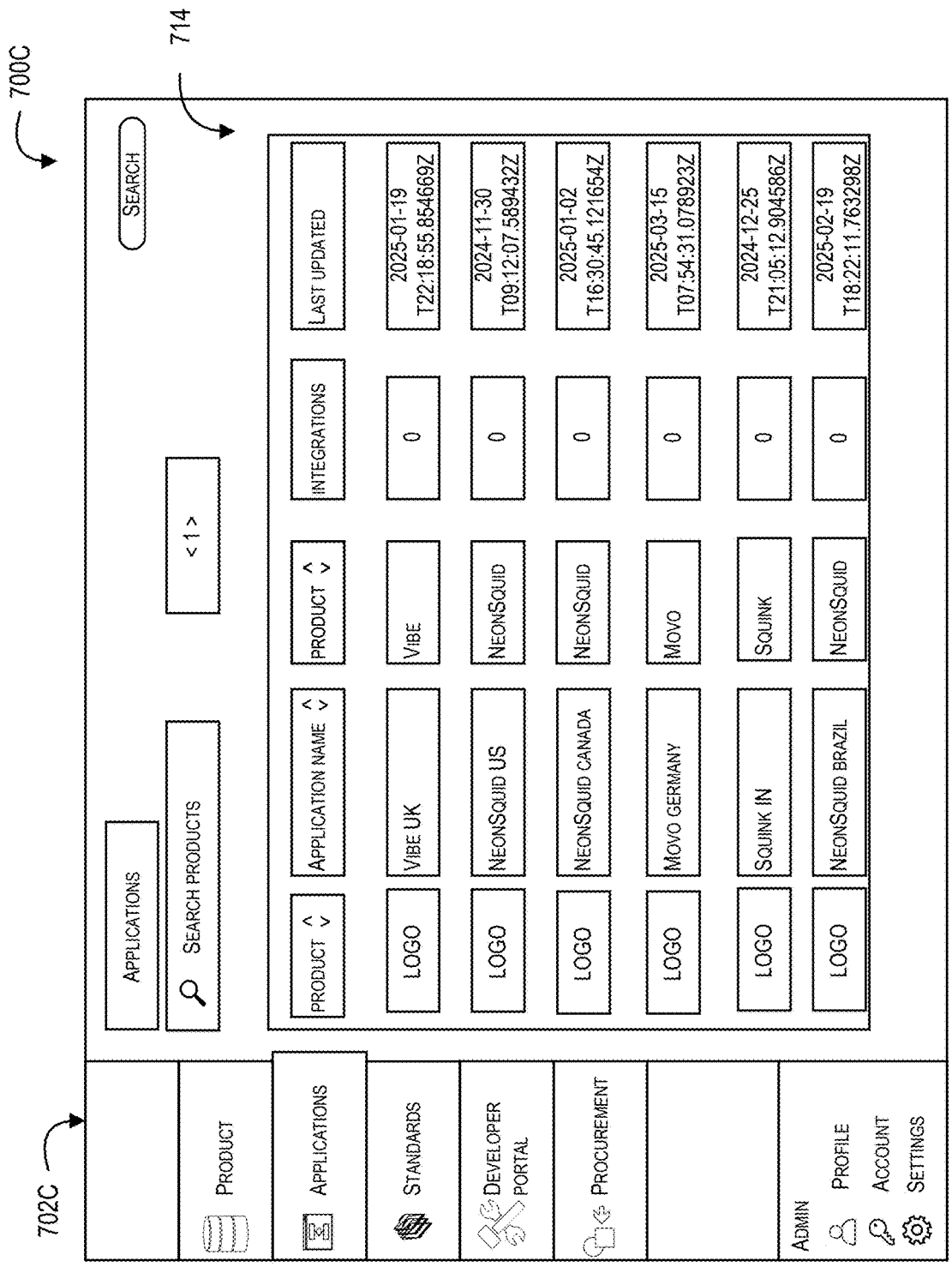

In an embodiment, referring to FIG. 7C, the user interface 700C may provide an application management dashboard, allowing administrators (users) to view and manage integrated enterprise applications. The administrators may access such features by selecting the application from the sidebar 702C. The main panel 714 may list applications with details such as product name, application name, number of integrations, and last updated timestamp. Each row may correspond to a specific application instance, such as NeonSquid US, NeonSquid Canada, Movo Germany, and Squink IN, allowing enterprises to manage geographically distributed deployments. The search bar may enable users to filter applications based on product name, application name, or integration status, ensuring efficient navigation and management of the application portfolio.

Figure 7D:
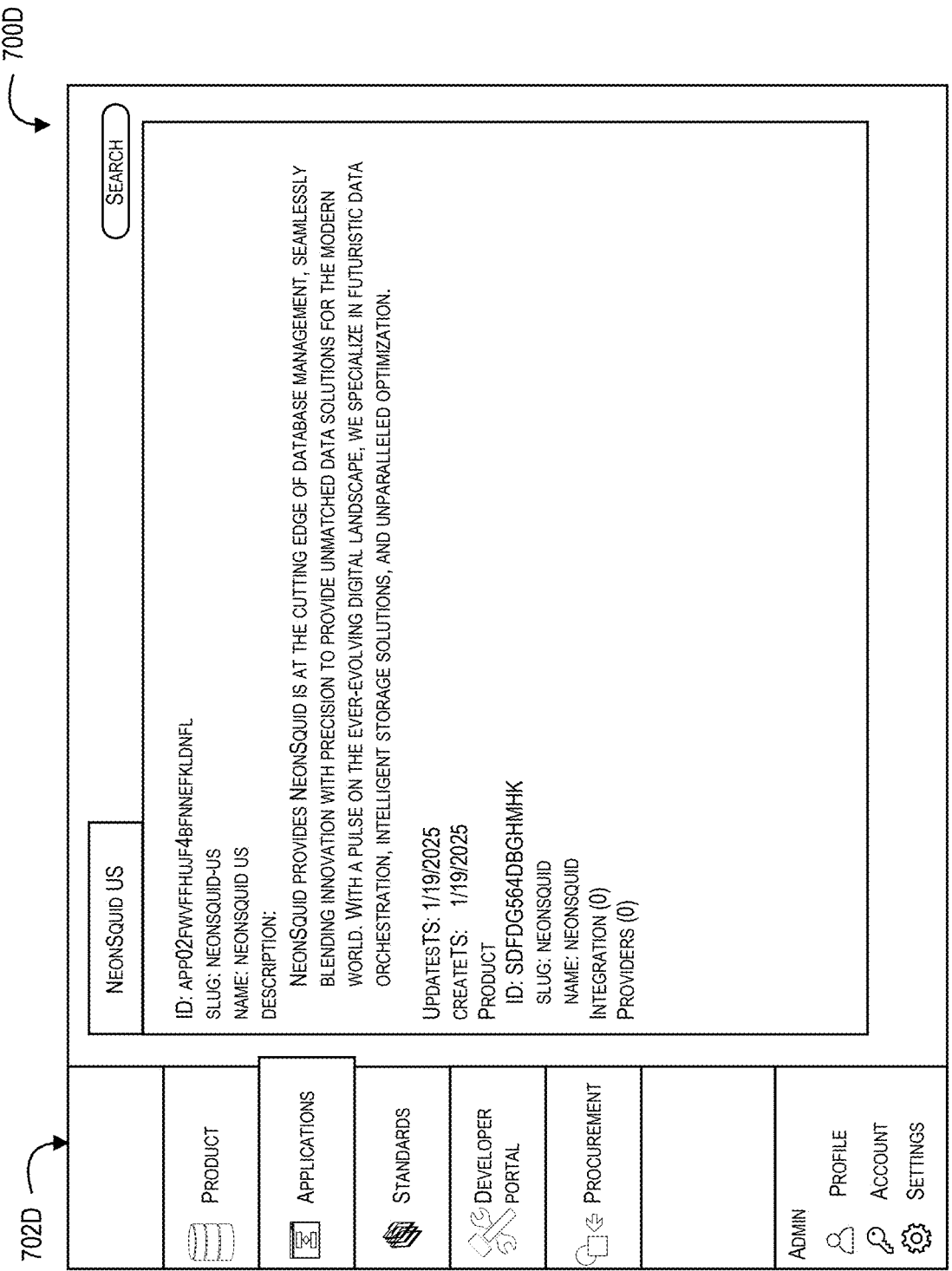

In an embodiment, referring to FIG. 7D, the user interface 700D for detailed application insights, focusing on a specific instance, NeonSquid US. The sidebar 702D provides consistent navigation options, while the main panel displays detailed metadata, including the application ID, slug, name, description, update timestamp, creation timestamp, and product association. The description section may highlight NeonSquid US version deployment details and capabilities, emphasizing its role in database management, data orchestration, intelligent storage, and performance optimization. The integration section may indicate whether the application is currently integrated into the enterprise control system, while the provider section lists associated enterprise standard providers, ensuring transparency and traceability.

Figure 8:
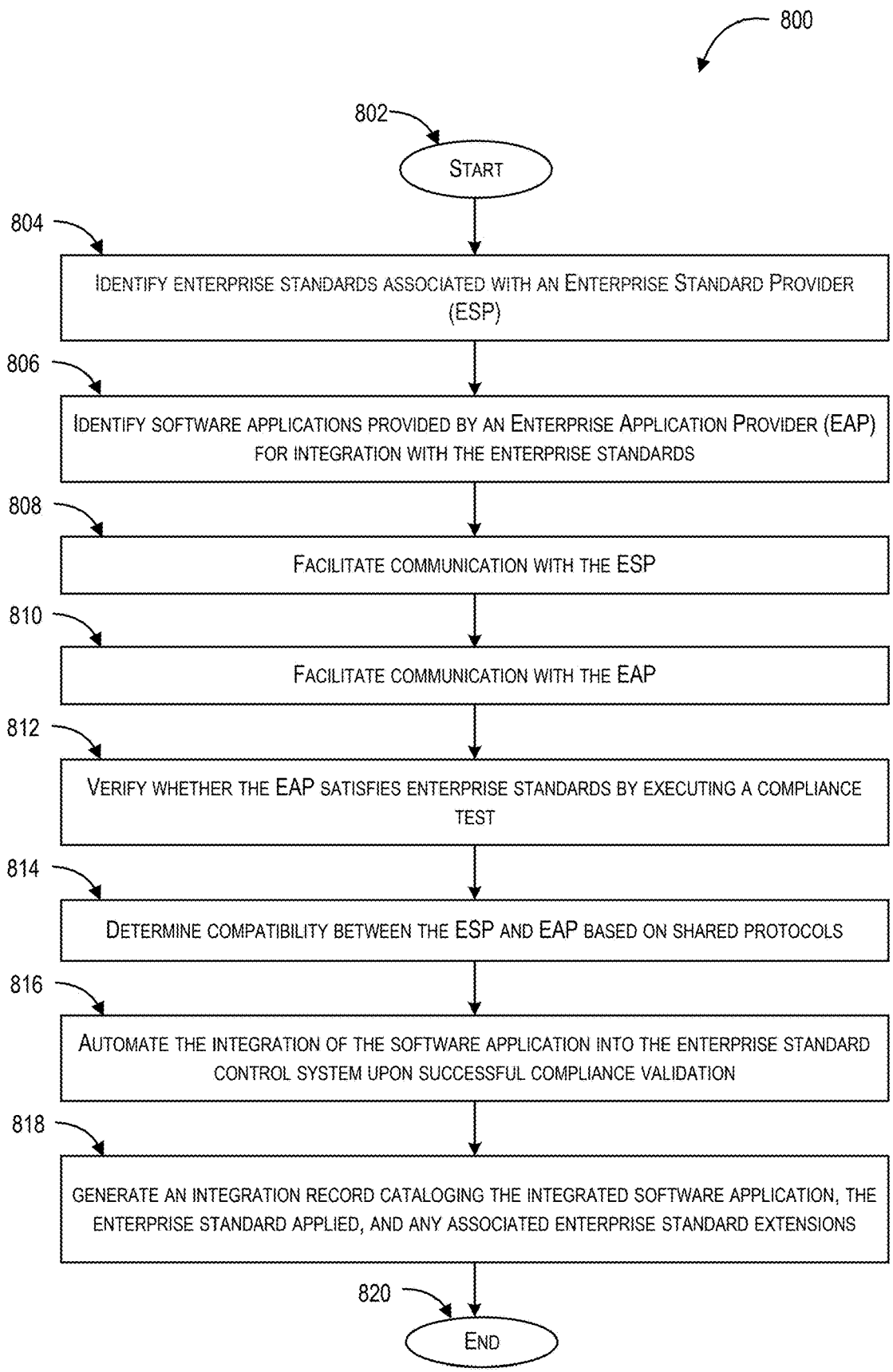
FIG. 8 is a flowchart illustrating a method for integrating software applications into enterprise standard control systems, in accordance with an embodiment of the present disclosure.

FIG. 8 is a flowchart 800 illustrating a method for integrating software applications into enterprise standard control systems, in accordance with an embodiment of the present disclosure. The method may start at step 802.

In an embodiment, the method, at step 804, may include the steps of identifying one or more enterprise standards associated with an enterprise standard provider (ESP). Such identification may ensure that the enterprise control system recognizes the specific protocols and compliance requirements that govern software integration within an enterprise ecosystem. Next, the method, at step 806, may include the steps of identifying one or more software applications provided by an enterprise application provider (EAP) for integration with the identified enterprise standards. The identification may facilitate the detection and onboarding of third-party software applications requiring integration into the enterprise's existing control systems.

In an embodiment, the method may enable seamless communication between the ESP and EAP, the method includes the steps of facilitating communication via an ESP-API for communication with the ESP, at step 808, and an EAP-API for communication with the EAP, at step 810. The corresponding interfaces may support standardized, secure data exchange between the enterprise control system and the software application being integrated. The method, at step 812, may include the steps of verifying whether the EAP satisfies one or more enterprise standards by executing a compliance test and determining, at step 814, compatibility between the ESP and EAP based on shared protocols. The verification may ensure that the software application meets the enterprise's compliance requirements before integration. Upon successful compliance verification, the method, at step 816, may include the steps of automating the integration of the software application into the enterprise standard control system and generating, at step 818, an integration record, cataloging the integrated software application, the enterprise standard applied, and any associated enterprise standard extensions (EXTs). In some embodiments, the integration record further includes metadata, such as protocol type, security tokens exchanged, user attribute mappings, and login/logout URLs.

In an embodiment, to ensure continued compliance, the method may include the steps of periodically revalidating the compliance of the integrated software application using an automated test suite. If the software application fails the periodic revalidation test, the method may include the steps of suspending or terminating the integration, thereby maintaining enterprise security and operational integrity. In an embodiment, the method may include the steps of identifying and supporting enterprise standard extensions (EXTs) for enhanced functionalities, including but not limited to attribute synchronization, privileged access management, and multi-factor authentication. The method may include the steps of automatically configuring an enterprise standard extension only when both the ESP and EAP support the extension.

In an embodiment, the method may include the steps of facilitating communication between the ESP and EAP via APIs configured to support at least one of RESTful APIs, GraphQL APIs, and SOAP APIs for data exchange. To ensure secure communication, the method may include the steps of encrypting communication between the ESP and the enterprise control system using TLS encryption and supporting multi-protocol communication through the EAP-API, including at least one of SAML, OIDC, and OAuth. To prevent unauthorized integration, the method may include the steps of authenticating enterprise ownership of the software application using an OAuth token, an enterprise purchase record, or an enterprise user approval workflow. In some embodiments, the method may include the steps of identifying one or more enterprise users authorized to approve integration, notifying the authorized user, and collecting and validating an OAuth token for the requested integration. Additionally, the method may include the steps of automatically validating ownership when the software application is procured through the system itself.

In an embodiment, the method may include the steps of maintaining a repository of integrated enterprise applications, the repository comprising the enterprise standard compliance status for each application, associated extensions implemented, and a risk assessment based on the application's security profile. In some embodiments, the method may include the steps of generating risk mitigation recommendations based on periodic compliance assessments. In an embodiment, the method may include the steps of reversing the integration upon detecting a failure event or compliance breach, ensuring enterprise control and system integrity. Furthermore, the method may include the steps of implementing the method in a cloud-based environment supporting multi-tenant architectures, facilitating scalable deployment across enterprise infrastructures. The method ends at step 820.

Figure 9:
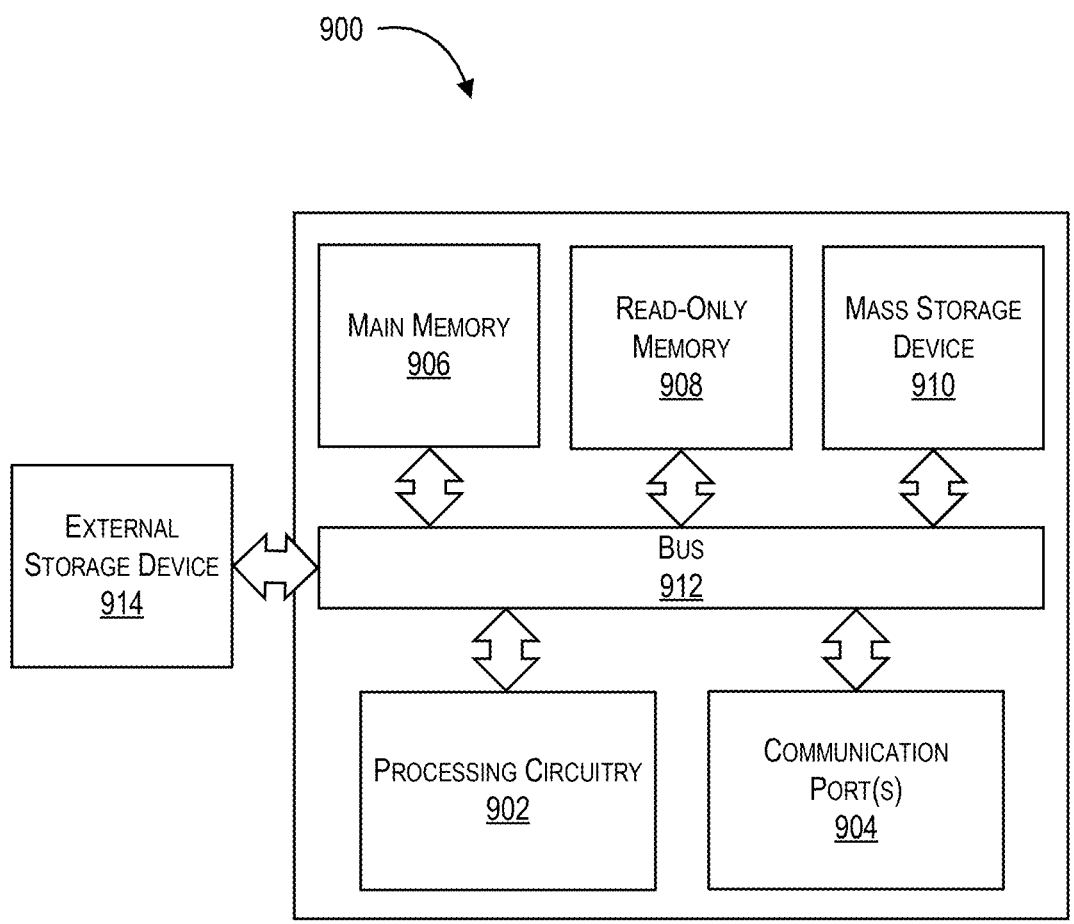
FIG. 9 is an exemplary computer system in which or with which embodiments of the present disclosure may be utilized.

FIG. 9 is an exemplary computer unit 900 in which or with which embodiments of the present disclosure may be utilized. Depending upon the implementation, the various processes and decision blocks described above may be performed by hardware components, embodied in machine-executable instructions, which may be used to cause a general-purpose or special-purpose processor programmed with the instructions to perform the steps, or the steps may be performed by a combination of hardware, software and/or firmware. As shown in FIG. 9, the computer system 900 includes an external storage device 914, a bus 912, a main memory 906, a read-only memory 908, a mass storage device 910, a communication port(s) 904, and a processing circuitry 902.

Those skilled in the art will appreciate that the computer system 900 may include more than one processing circuitry 902 and one or more communication ports 904. The processing circuitry 902 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quad-core, Hexa-core, or any suitable number of cores) or supercomputer. In some embodiments, the processing circuitry 902 is distributed across multiple separate processors or processing units, for example, multiple of the same type of processing units (e.g., two Intel Core i7 processors) or multiple different processors (e.g., an Intel Core i5 processor and an Intel Core i7 processor). Examples of the processing circuitry 902 include, but are not limited to, an Intel® Itanium® or Itanium 2 processor(s), AMD® Opteron® or Athlon MP® processor(s), Motorola® lines of processors, System on Chip (SoC) processors, or other future processors. The processing circuitry 902 may include various modules associated with embodiments of the present disclosure.

The communication port 904 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 904 may be any RS-232 port for use with a modem-based dialup connection, a 10/100 Ethernet port, a Gigabit, or a 10 Gigabit port using copper or fiber, a serial port, a parallel port, or other existing or future ports. The communication port 904 may be chosen depending on a network, such as a Local Area Network (LAN), Wide Area Network (WAN), or any network to which the computer system 900 may be connected.

The main memory 906 may include Random Access Memory (RAM) or any other dynamic storage device commonly known in the art. Read-only memory (ROM) 908 may be any static storage device(s), e.g., but not limited to, a Programmable Read-Only Memory (PROM) chips for storing static information, e.g., start-up or BIOS instructions for the processing circuitry 902.

The mass storage device 910 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 906. The mass storage device 910 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 912 communicatively couples the processing circuitry 902 with the other memory, storage, and communication blocks. The bus 912 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 902 to the software system.

Optionally, operator and administrative interfaces, e.g., a display, keyboard, and a cursor control device, may also be coupled to the bus 912 to support direct operator interaction with the computer system 900. Other operator and administrative interfaces may be provided through network connections connected through the communication port(s) 904. The external storage device 914 may be any kind of external hard drives, floppy drives, IOMEGA® Zip Drive, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

The computer system 900 may be accessed through a user interface. The user interface application may be implemented using any suitable architecture. For example, it may be a stand-alone application wholly implemented on the computer system 900. The user interfaces application and/or any instructions for performing any of the embodiments discussed herein may be encoded on computer-readable media. Computer-readable media includes any media capable of storing data. In some embodiments, the user interface application is client-server-based. Data for use by a thick or thin client implemented on an electronic device computer system 900 is retrieved on-demand by issuing requests to a server remote to the computer system 900. For example, computer system 900 may receive inputs from the user via an input interface and transmit those inputs to the remote server for processing and generating the corresponding outputs. The generated output is then transmitted to the computer system 900 for presentation to the user.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for integrating software applications into enterprise standard control systems, the system comprising one or more processors, a data storage unit, and one or more modules communicatively coupled to the one or more processors and the data storage unit, wherein each module of the one or more modules comprises executable instructions stored on a non-transitory computer-readable medium of the system and, when executed by the one or more processors, causes the one or more processors to perform recited functions, the one or more modules including:
    an enterprise standard recognition module configured to identify one or more enterprise standards associated with an enterprise standard provider (ESP);
    an application integration module configured to identify one or more software applications provided by an enterprise application provider (EAP) for integration with the enterprise standards;
    an interface module comprising:
        an ESP-API interface for facilitating communication with the ESP; and
        an EAP-API interface for facilitating communication with the EAP;
    a compliance validation module configured to:
        verify whether the EAP satisfies one or more enterprise standards by executing a compliance test;
        determine compatibility between the ESP and EAP based on shared protocols;
    an integration management module configured to:
        automate the integration of the software application into the enterprise standard control system upon successful compliance validation; and
        generate an integration record cataloging the integrated software application, the enterprise standard applied, and any associated enterprise standard extensions (EXTs); and
    a proof-of-ownership module configured to authenticate enterprise ownership of the software application using one or more of: an OAuth token, enterprise purchase record, and enterprise user approval workflow.

2. The system of claim 1, wherein the compliance validation module further comprises an automated test suite configured to periodically revalidate the compliance of the integrated software application.

3. The system of claim 1, wherein the integration management module is further configured to suspend or terminate integration if the EAP fails a periodic revalidation test.

4. The system of claim 1, wherein the integration record includes metadata, comprising at least one of: protocol type, security tokens exchanged, user attribute mappings, and login/logout URLs.

5. The system of claim 1, wherein the enterprise standard recognition module is further configured to identify and support enterprise standard extensions (EXTs) for enhanced functionalities, including attribute synchronization, privileged access management, and multi-factor authentication.

6. The system of claim 5, wherein the integration management module configures the enterprise standard extension only when both the ESP and EAP support the extension.

7. The system of claim 1, wherein the ESP-API interface and EAP-API interface are configured to support at least one of: RESTful APIs, GraphQL APIs, and SOAP APIs for data exchange.

8. The system of claim 1, wherein the ESP-API interface is further configured to encrypt communication between the enterprise standard recognition module and the ESP using TLS encryption.

9. The system of claim 1, wherein the EAP-API interface is further configured to support multi-protocol communication, including SAML, OIDC, and OAuth.

10. The system of claim 1, wherein the proof-of-ownership module further comprises an approval workflow engine configured to:
    identify one or more enterprise users authorized to approve integration;
    notify the authorized user; and
    collect and validate an OAuth token for the requested integration.

11. The system of claim 1, wherein the proof-of-ownership module is further configured to validate ownership when the software application is procured through the system itself.

12. The system of claim 1, wherein the one or more modules further comprising a catalog module configured to:
    maintain a repository of integrated enterprise applications, wherein the repository includes:
        enterprise standard compliance status for each application;
        associated extensions implemented; and
        risk assessment based on the application's security profile; and
    generate risk mitigation recommendations based on periodic compliance assessments.

13. The system of claim 1, wherein the integration management module further comprises a rollback mechanism configured to reverse the integration in response to a failure event or compliance breach.

14. A method for integrating software applications into enterprise standard control systems, the method comprising:
    identifying one or more enterprise standards associated with an enterprise standard provider (ESP);
    identifying one or more software applications provided by an enterprise application provider (EAP) for integration with the enterprise standards;
    facilitating communication between the ESP and the EAP via:
        an ESP-API for communication with the ESP; and
        an EAP-API for communication with the EAP;
    verifying whether the EAP satisfies one or more enterprise standards by executing a compliance test;
    determining compatibility between the ESP and EAP based on shared protocols;

automating the integration of the software application into the enterprise standard control system upon successful compliance verification;

generating an integration record cataloging the integrated software application, the enterprise standard applied, and any associated enterprise standard extensions (EXTs); and authenticating enterprise ownership of the software application using one or more of: an OAuth token, enterprise purchase record, and enterprise user approval workflow.

15. The method of claim 14, further comprises:
periodically revalidating the compliance of the integrated software application using an automated test suite;
suspending or terminating the integration if the EAP fails a periodic revalidation test; and
including metadata in the generated integration record, wherein the metadata comprising at least one of: protocol type, security tokens exchanged, user attribute mappings, and login/logout URLs.

16. The method of claim 14, further comprises:
identifying and supporting enterprise standard extensions (EXTs) for enhanced functionalities, including attribute synchronization, privileged access management, and multi-factor authentication; and
configuring the enterprise standard extension only when both the ESP and EAP support the extension.

17. The method of claim 14, further comprises:
encrypting communication between the ESP and the enterprise control system using TLS encryption; and
supporting multi-protocol communication through the EAP-API, including at least one of: SAML, OIDC, and OAuth.

18. The method of claim 14, wherein authenticating enterprise ownership further comprises:
identifying one or more enterprise users authorized to approve integration;
notifying the authorized user; and
collecting and validating an OAuth token for the requested integration.

19. The method of claim 14, further comprises validating ownership when the software application is procured through the system itself.

20. The method of claim 14, further comprises:
maintaining a repository of integrated enterprise applications, wherein the repository includes:
enterprise standard compliance status for each application;
associated extensions implemented; and
risk assessment based on the application's security profile; and
generating risk mitigation recommendations based on periodic compliance assessments.

* * * * *